United States Patent
Zheng et al.

(10) Patent No.: US 12,299,346 B2
(45) Date of Patent: May 13, 2025

(54) FRAME RATE SWITCHING METHOD AND RELATED APPARATUS

(71) Applicant: HONOR DEVICE CO., LTD., Shenzhen (CN)

(72) Inventors: Ziyi Zheng, Shenzhen (CN); Jiehua Tang, Shenzhen (CN); Jiandong Deng, Shenzhen (CN); Chengzhi Zheng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/559,671

(22) PCT Filed: Dec. 13, 2022

(86) PCT No.: PCT/CN2022/138763
§ 371 (c)(1),
(2) Date: Nov. 8, 2023

(87) PCT Pub. No.: WO2023/160136
PCT Pub. Date: Aug. 31, 2023

(65) Prior Publication Data
US 2024/0211198 A1   Jun. 27, 2024

(30) Foreign Application Priority Data
Feb. 28, 2022 (CN) .......... 202210190777.3

(51) Int. Cl.
G06F 3/0485 (2022.01)
G06F 3/147 (2006.01)

(52) U.S. Cl.
CPC .......... *G06F 3/147* (2013.01); *G06F 3/0485* (2013.01)

(58) Field of Classification Search
None
See application file for complete search history.

(56) References Cited

U.S. PATENT DOCUMENTS 10,096,303 B2   10/2018   Lee et al.
11,069,327 B2   7/2021   Ji et al.
(Continued)

FOREIGN PATENT DOCUMENTS

CN   102088563 A   6/2011
CN   105389144 A   3/2016
(Continued)

OTHER PUBLICATIONS

Translation of CN 112331145A into English; Gao et al. (Year: 2021).*

*Primary Examiner* — Brian M Butcher
(74) *Attorney, Agent, or Firm* — WOMBLE BOND DICKINSON (US) LLP

(57) ABSTRACT

Embodiments of this application provide a frame rate switching method and a related apparatus, and relate to the field of terminal technologies. In a frame rate switching process, a plurality of transition frame rates can be set. A difference value between any two adjacent transition frame rates of the plurality of transition frame rates is less than a preset value, to enable switching of a screen refresh rate of a display screen to be smoother without spanning too much; and in a switching process, a drawing frequency on an application processor AP side of a terminal device is kept synchronously changing with a TE signal obtained from an IC by the AP side, to avoid frame loss during switching.

20 Claims, 16 Drawing Sheets

(56) References Cited

U.S. PATENT DOCUMENTS

| | | |
|---|---|---|
| 11,328,661 B2 * | 5/2022 | Lee ................. G09G 3/3208 |
| 11,893,929 B2 | 2/2024 | Yang et al. |
| 11,942,062 B2 | 3/2024 | Huang |
| 11,948,520 B2 | 4/2024 | Youn et al. |
| 2016/0078846 A1 | 3/2016 | Liu et al. |
| 2018/0040301 A1 | 2/2018 | Bae et al. |
| 2019/0340973 A1 | 11/2019 | Kim |
| 2021/0248957 A1 | 8/2021 | Lee et al. |
| 2023/0134189 A1 | 5/2023 | Xu et al. |
| 2023/0282162 A1 | 9/2023 | Gao et al. |

FOREIGN PATENT DOCUMENTS

| | | | |
|---|---|---|---|
| CN | 111968582 | A | 11/2020 |
| CN | 112331145 | A | 2/2021 |
| CN | 112445315 | A | 3/2021 |
| CN | 113050906 | A | 6/2021 |
| CN | 113160747 | A | 7/2021 |
| CN | 113160748 | A | 7/2021 |
| CN | 113362783 | A | 9/2021 |
| CN | 113608713 | A | 11/2021 |
| CN | 113630572 | A | 11/2021 |
| EP | 3786935 | A1 | 3/2021 |
| WO | 2018161572 | A1 | 9/2018 |
| WO | 2021143676 | A1 | 7/2021 |
| WO | 2021175213 | A1 | 9/2021 |
| WO | 2021201844 | A1 | 10/2021 |

\* cited by examiner

FRAME RATE SWITCHING METHOD AND RELATED APPARATUS

CROSS-REFERECNE TO RELATED APPLICATIONS

This application is a national stage of International Application No. PCT/CN2022/138763, filed on Dec. 13, 2022, which claims priority to Chinese Patent Application No. 202210190777.3, filed on Feb. 28, 2022. The disclosures of both of the aforementioned applications are hereby incorporated by reference in their entireties.

TECHNICAL FIELD

This application relates to the field of terminal technologies, and in particular, to a frame rate switching method and a related apparatus.

BACKGROUND

A user may browse various types of content through a display screen of a terminal device. When there is a lot of content, the display screen cannot display all the content at once, and the user may swipe through relevant content on the display screen.

Screen refresh rates used by the terminal device in different display scenarios may be different. For example, the terminal device may use a higher screen refresh rate when the user swipes through the content on the display screen; the terminal device may use a lower refresh rate when the content displayed on the display screen is relatively fixed. The screen refresh rates may include 1 Hz (Hz), 20 Hz, 30 Hz, 60 Hz, 90 Hz, 120 Hz, or the like.

However, when the user has a hand sliding away from a sliding interface, the display screen of the terminal device may freeze or flicker.

SUMMARY

Embodiments of this application provide a frame rate switching method and a related apparatus. A terminal device may realize smooth switching of a screen refresh rate of a display screen, and keep a drawing frequency on an application processor (application processor, AP) side of the terminal device synchronously changing with a tearing effect (tearing effect, TE) signal obtained from an integrated circuit (integrated circuit, IC) by the AP side in a switching process, to reduce frame loss in the smooth switching, thereby improving picture freezing or flickering of the display screen.

According to a first aspect, embodiments of this application provide a frame rate switching method applied to a terminal device. The terminal device includes an application processor AP and an integrated circuit IC. The AP is electrically connected to the IC, for the AP to obtain a tearing effect TE signal from the IC. The method includes: determining to perform switching of a screen refresh rate; and switching the screen refresh rate from a first frame rate to a second frame rate by using a preset frame rate switching policy. In the frame rate switching policy, a plurality of non-consecutive transition frame rates are set between the first frame rate and the second frame rate. In a process that the first frame rate is switched to the second frame rate stepwise through the plurality of transition frame rates sequentially, a difference value between any two adjacent frame rates is less than a preset value. In addition, a drawing frequency on an AP side of the terminal device synchronously changes with the TE signal obtained by the AP side.

In this way, the difference value between any two adjacent transition frame rates of the plurality of transition frame rates is less than the preset value, to enable the switching of the screen refresh rate of the display screen to be smoother without spanning too much; and in the switching process, the drawing frequency on the application processor AP side of the terminal device is kept synchronously changing with the TE signal obtained from the IC by the AP side, to avoid the frame loss during switching. Therefore, setting of the transition frame rates is not limited to a frame rate corresponding to an integer multiple of a minimum refresh time, and the picture freezing or flickering of the display screen can be alleviated. In addition, frequency control in embodiments of this application does not depend on hardware performance of the terminal device, and has no great requirements on the hardware performance of the terminal device.

In a possible implementation, the plurality of transition frame rates include a target frame rate, and a refresh time corresponding to the target frame rate is in a non-integer multiple relationship with the minimum refresh time of the display screen. In a process of switching the screen refresh rate from the first frame rate to the second frame rate by using the frame rate policy, when a frame rate adjacent to the target frame rate is switched to the target frame rate, or the target frame rate is switched to the frame rate adjacent to the target frame rate, the TE signal obtained by the AP side takes effect in a next frame of a next frame of a switching frame, and the switching frame is a frame corresponding to a case that a switching frame rate instruction is obtained.

In this way, by putting the TE signal into effect in the next frame of the next frame of the switching frame, when the transition frame rates include the target frame rate in which the refresh time is in the non-integer multiple relationship with the minimum refresh time of the display screen, a drawing process on the AP side does not cause a problem of the frame loss because the drawing frequency is not synchronized with the TE signal.

In a possible implementation, when the target frame rate is switched to a frame rate lower than the target frame rate, a vertical synchronization signal Vsync in the IC is first adjusted to a maximum screen refresh rate of the display screen after a period corresponding to the target frame rate ends, and then adjusted to the frame rate lower than the target frame rate after a period corresponding to the maximum screen refresh rate of the display screen ends. This can alleviate the problem of the frame loss caused by confusion of the switching frame resulting from extension of the Vsync period of the target frame rate.

In a possible implementation, after switching the screen refresh rate from the first frame rate to the second frame rate by using the preset frame rate switching policy, the method further includes: maintaining the second frame rate if a sliding speed of a list control is higher than a second speed threshold, when the terminal device has switched to the second frame rate; and switching the screen display rate of the display screen from the second frame rate to a third frame rate through the IC, when the sliding speed of the list control is lower than or equal to the second speed threshold, where the third frame rate is lower than the second frame rate. In this way, when the list control is sliding, the terminal device can still maintain a high screen refresh rate, to alleviate a problem of interface flickering or freezing caused by an excessively low screen refresh rate. When the list control is stationary, the AP side may be unaware that the screen display rate of the display screen is switched from the second frame rate to the third frame rate by using the IC, to reduce resource occupation on the AP side.

In a possible implementation, the second frame rate is a preset frame rate, and the third frame rate is a minimum screen refresh rate of the terminal device. This may be applied to smooth frame rate switching after a user has a hand sliding away from the list control, to reduce the freezing or screen flickering.

In a possible implementation, the method further includes: switching the screen refresh rate of the display screen to the first frame rate if a sliding operation for the list control is received, in a process of switching the screen refresh rate from the first frame rate to the second frame rate by using the frame rate switching policy. This enables a frame rate to adapt to the sliding list control again to improve a display effect.

In a possible implementation, if the sliding operation for the list control is received, the screen refresh rate of the display screen is the target frame rate; when the screen refresh rate of the display screen is switched from the target frame rate to the first frame rate, the TE signal obtained by the AP side takes effect in the next frame of the next frame of the switching frame, and the switching frame is a frame corresponding to a case that the switching frame rate instruction is obtained. In this way, when the transition frame rates include the target frame rate in which the refresh time is in a non-integer multiple relationship with the minimum refresh time of the display screen, the drawing process on the AP side does not cause the problem of the frame loss because the drawing frequency is not synchronized with the TE signal.

In a possible implementation, the determining to perform the switching of the screen refresh rate includes: calculating the sliding speed of the list control in the display screen in response to an up event of the sliding operation in the display screen, where the sliding operation acts on the list control; and determining to perform the switching of the screen refresh rate when the sliding speed of the list control is lower than or equal to a first speed threshold. In this way, the user may realize the smooth frame rate switching after having a hand sliding away from the list control, to reduce the freezing and screen flickering.

In a possible implementation, the first frame rate is the maximum screen refresh rate of the display screen. This enables the display screen to achieve a better display effect at the maximum screen refresh rate.

According to a second aspect, embodiments of this application provide a frame rate switching apparatus, where the frame rate switching apparatus may be a terminal device, or may be a chip or a system-on-chip in the terminal device. The frame rate switching apparatus may include a display unit, a processing unit, and an integrated circuit IC. When the frame rate switching apparatus is the terminal device, the display unit herein may be a display screen. The display unit is configured to execute a display step, so that the terminal device implements a display-related method according to the first aspect or any one of possible implementations of the first aspect. The processing unit is configured to implement any processing-related method according to the first aspect or any one of possible implementations of the first aspect. When the frame rate switching apparatus is the terminal device, the processing unit may be a processor. The frame rate switching apparatus may further include a storage unit, where the storage unit may be a memory. The storage unit is configured to store instructions, and the processing unit executes the instructions stored in the storage unit, to enable the terminal device to implement a method according to the first aspect or any one of possible implementations of the first aspect. When the frame rate switching apparatus is the chip or the system-on-chip in the terminal device, the processing unit may be a processor. The processing unit executes the instructions stored in the storage unit, to enable the terminal device to implement a method according to the first aspect or any one of possible implementations of the first aspect. The storage unit may be a storage unit (for example, a register or a buffer) in the chip, or a storage unit (for example, a read-only memory or a random access memory) located outside the chip within the terminal device.

For example, the processing unit is configured to determine to perform switching of a screen refresh rate, and switch the screen refresh rate from a first frame rate to a second frame rate by using a preset frame rate switching policy. In the frame rate switching policy, a plurality of non-consecutive transition frame rates are set between the first frame rate and the second frame rate. In a process that the first frame rate is switched to the second frame rate stepwise through the plurality of transition frame rates sequentially, a difference value between any two adjacent frame rates is less than a preset value. In addition, a drawing frequency on an AP side of the terminal device synchronously changes with the TE signal obtained by the AP side.

In a possible implementation, the plurality of transition frame rates include a target frame rate, and a refresh time corresponding to the target frame rate is in a non-integer multiple relationship with the minimum refresh time of the display screen. In a process of switching the screen refresh rate from the first frame rate to the second frame rate by using the frame rate policy, when a frame rate adjacent to the target frame rate is switched to the target frame rate, or the target frame rate is switched to the frame rate adjacent to the target frame rate, the TE signal obtained by the AP side takes effect in a next frame of a next frame of a switching frame, and the switching frame is a frame corresponding to a case that a switching frame rate instruction is obtained.

In a possible implementation, when the target frame rate is switched to a frame rate lower than the target frame rate, a vertical synchronization signal Vsync in the IC is first adjusted to a maximum screen refresh rate of the display screen after a period corresponding to the target frame rate ends, and then adjusted to the frame rate lower than the target frame rate after a period corresponding to the maximum screen refresh rate of the display screen ends.

In a possible implementation, the processing unit is further configured to maintain the second frame rate if a sliding speed of a list control is higher than a second speed threshold, when the terminal device has switched to the second frame rate; and switch the screen display rate of the display screen from the second frame rate to a third frame rate through the IC, when the sliding speed of the list control is lower than or equal to the second speed threshold, where the third frame rate is lower than the second frame rate.

In a possible implementation, the second frame rate is a preset frame rate, and the third frame rate is a minimum screen refresh rate of the terminal device.

In a possible implementation, the processing unit is further configured to switch the screen refresh rate of the display screen to the first frame rate if a sliding operation for the list control is received, in a process of switching the screen refresh rate from the first frame rate to the second frame rate by using the frame rate switching policy.

In a possible implementation, if the sliding operation for the list control is received, the screen refresh rate of the display screen is the target frame rate; when the screen refresh rate of the display screen is switched from the target frame rate to the first frame rate, the TE signal obtained by the AP side takes effect in the next frame of the next frame of the switching frame, and the switching frame is a frame corresponding to a case that the switching frame rate instruction is obtained.

In a possible implementation, the processing unit is specially configured to calculate the sliding speed of the list control in the display screen in response to an up event of the sliding operation in the display screen, where the sliding operation acts on the list control; and determine to perform the switching of the screen refresh rate when the sliding speed of the list control is lower than or equal to a first speed threshold.

In a possible implementation, the first frame rate is the maximum screen refresh rate of the display screen.

According to a third aspect, embodiments of this application provide an electronic device, including a processor and a memory. The memory is configured to store code instructions, and the processor is configured to run the code instructions, to execute the method according to the first aspect or any one of possible implementations of the first aspect.

According to a fourth aspect, embodiments of this application provide a computer-readable storage medium. The computer-readable storage medium stores a computer program or instructions, and when the computer program or the instructions are run on a computer, the computer is enabled to execute the frame rate switching method according to the first aspect or any one of possible implementations of the first aspect.

According to a fifth aspect, embodiments of this application provide a computer program product including a computer program. When the computer program is run on a computer, the computer is enabled to execute the frame rate switching method according to the first aspect or any one of possible implementations of the first aspect.

According to a sixth aspect, this application provides a chip or a system-on-chip. The chip or system-on-chip includes at least one processor and a communication interface. The communication interface and at least one processor are interconnected through a wire. The at least one processor is configured to run a computer program or instructions to execute the frame rate switching method according to the first aspect or any one of possible implementations of the first aspect. The communication interface in the chip may be an input/output interface, a pin, a circuit, or the like.

In a possible implementation, the chip or the system-on-chip according to this application further includes at least one memory, and the at least one memory stores instructions. The memory may be a storage unit inside the chip, such as a register or a buffer, or may be a storage unit (for example, a read-only memory or a random access memory) of the chip.

It should be understood that technical solutions of the second aspect to the sixth aspect of this application correspond to those of the first aspect of this application, and beneficial effects achieved in these aspects and corresponding feasible implementations are similar. Details are not described again.

DESCRIPTION OF EMBODIMENTS

Figure 1A:
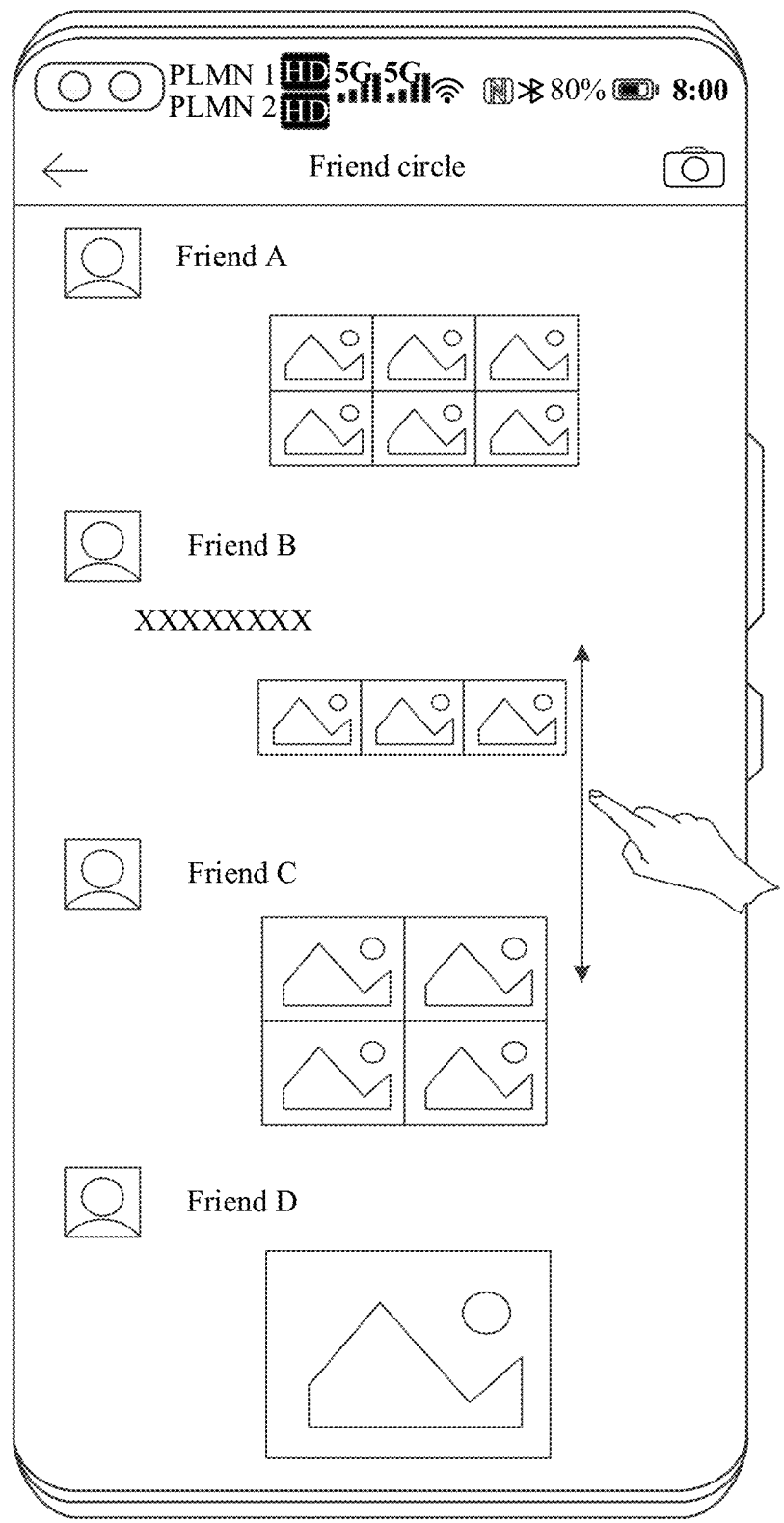
FIG. 1A, FIG. 1B, FIG. 1C, FIG. 1D, FIG. 1E, and FIG. 1F are schematic diagrams of a scenario to which an embodiment of this application is applicable.
Figure 1B:
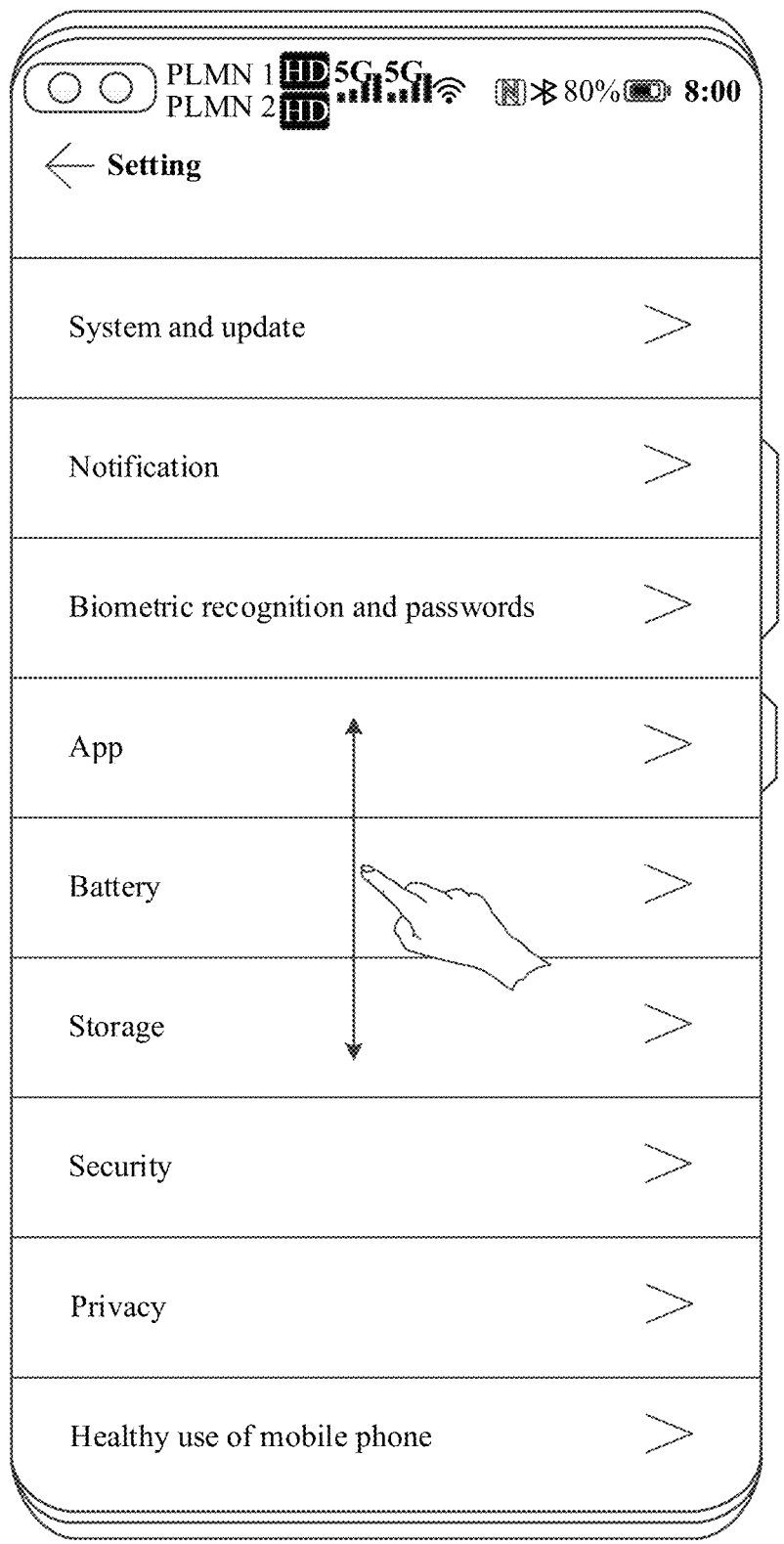
Figure 1C:
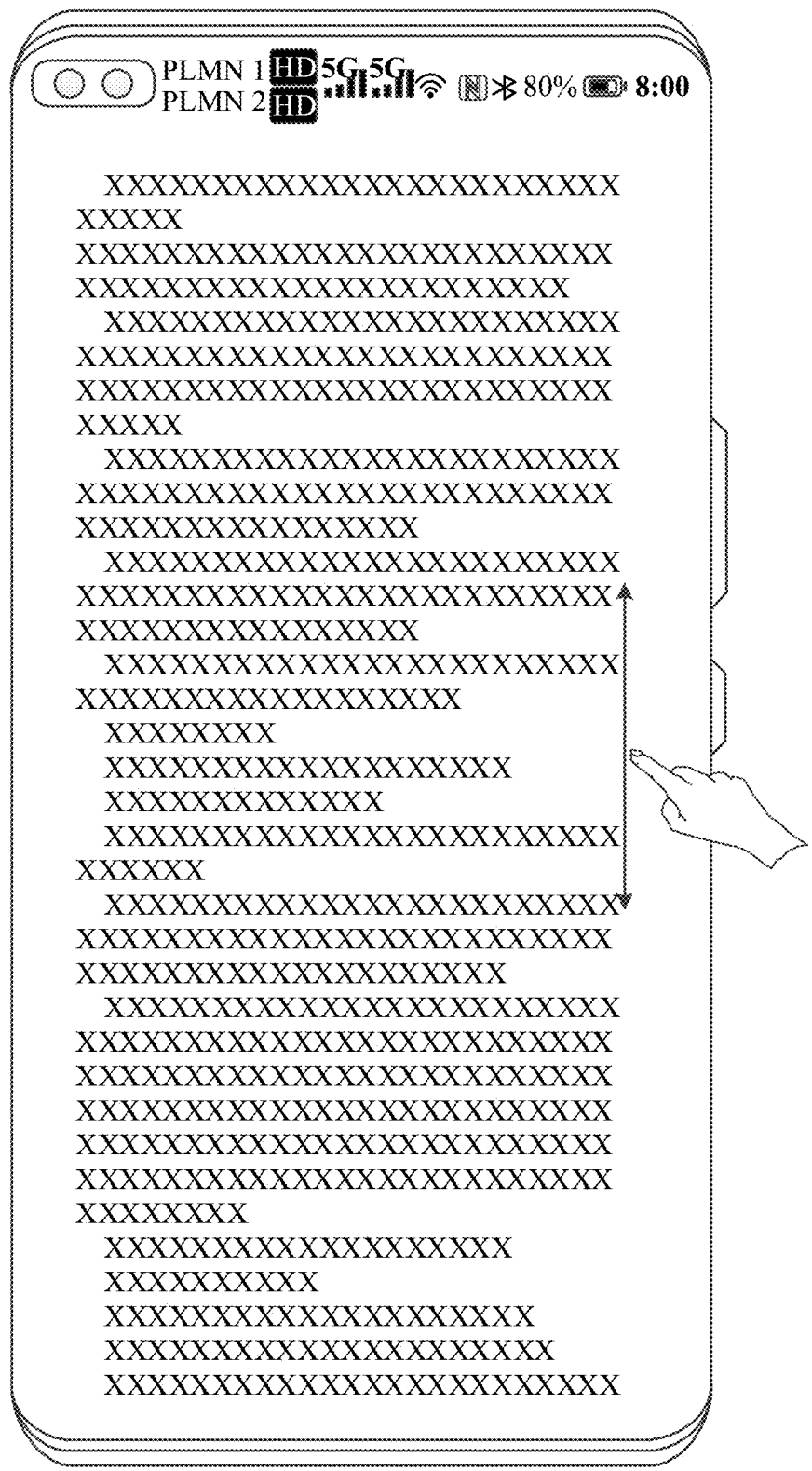
Figure 1D:
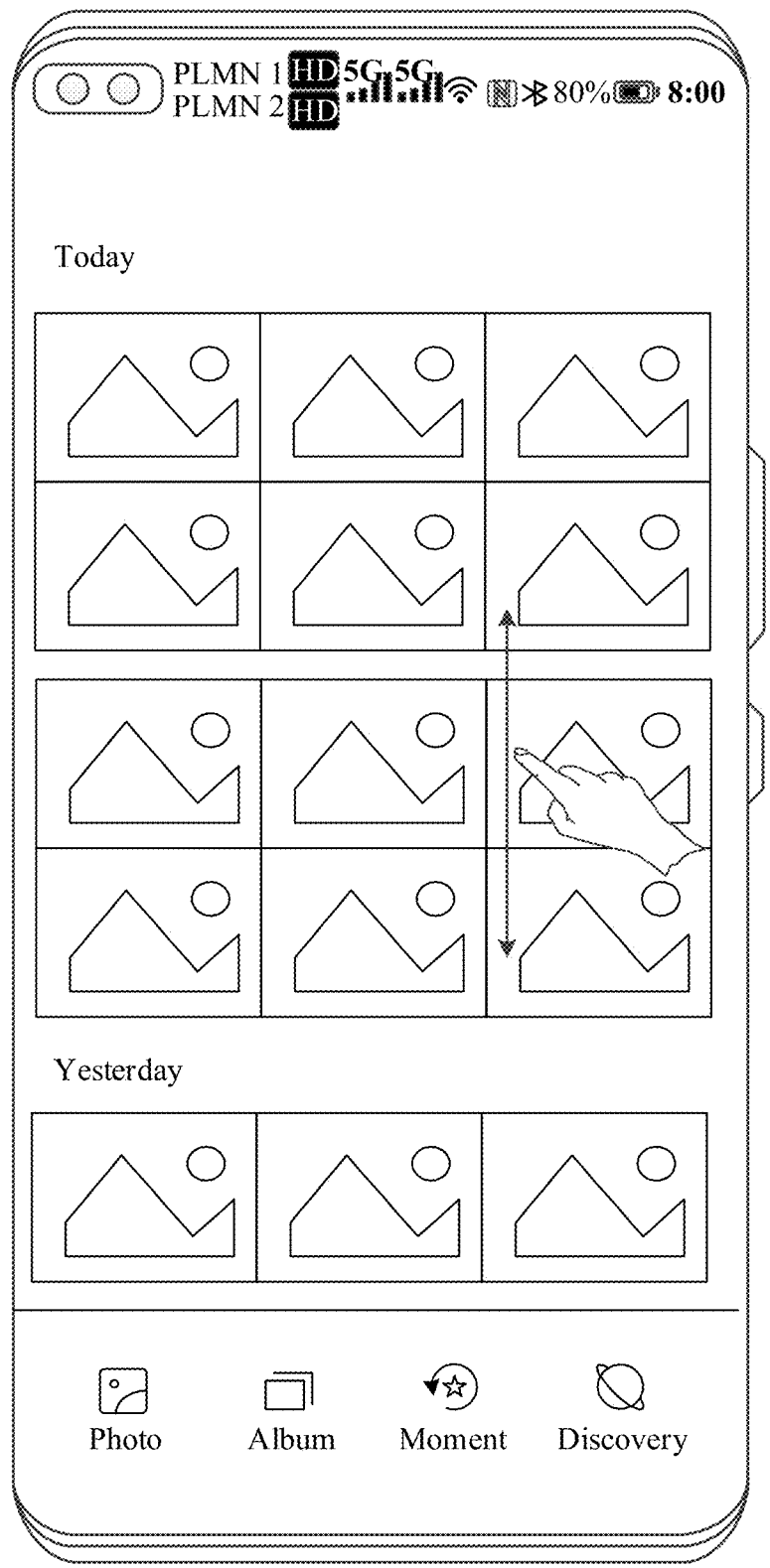
Figure 1E:
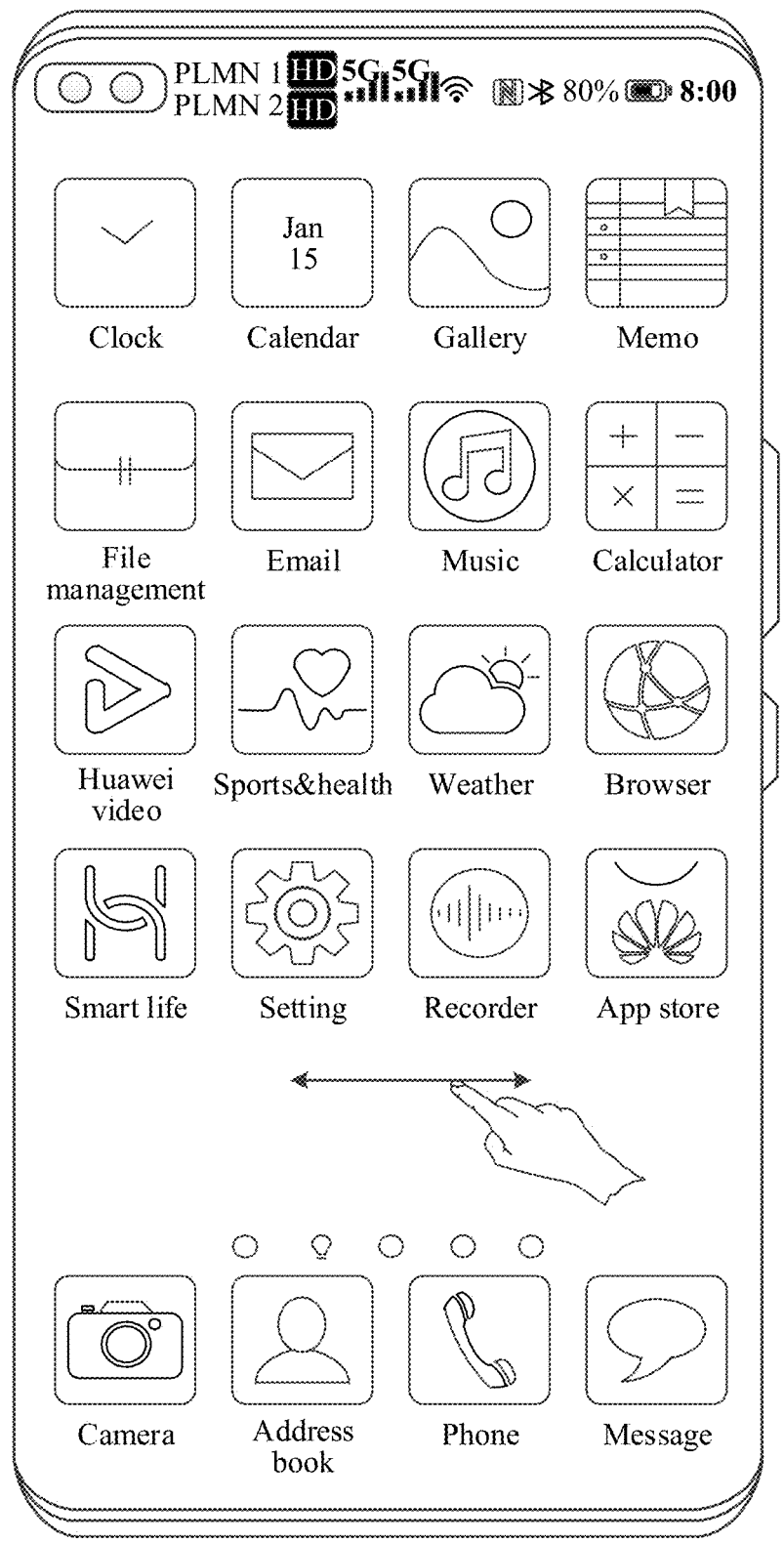
Figure 1F:
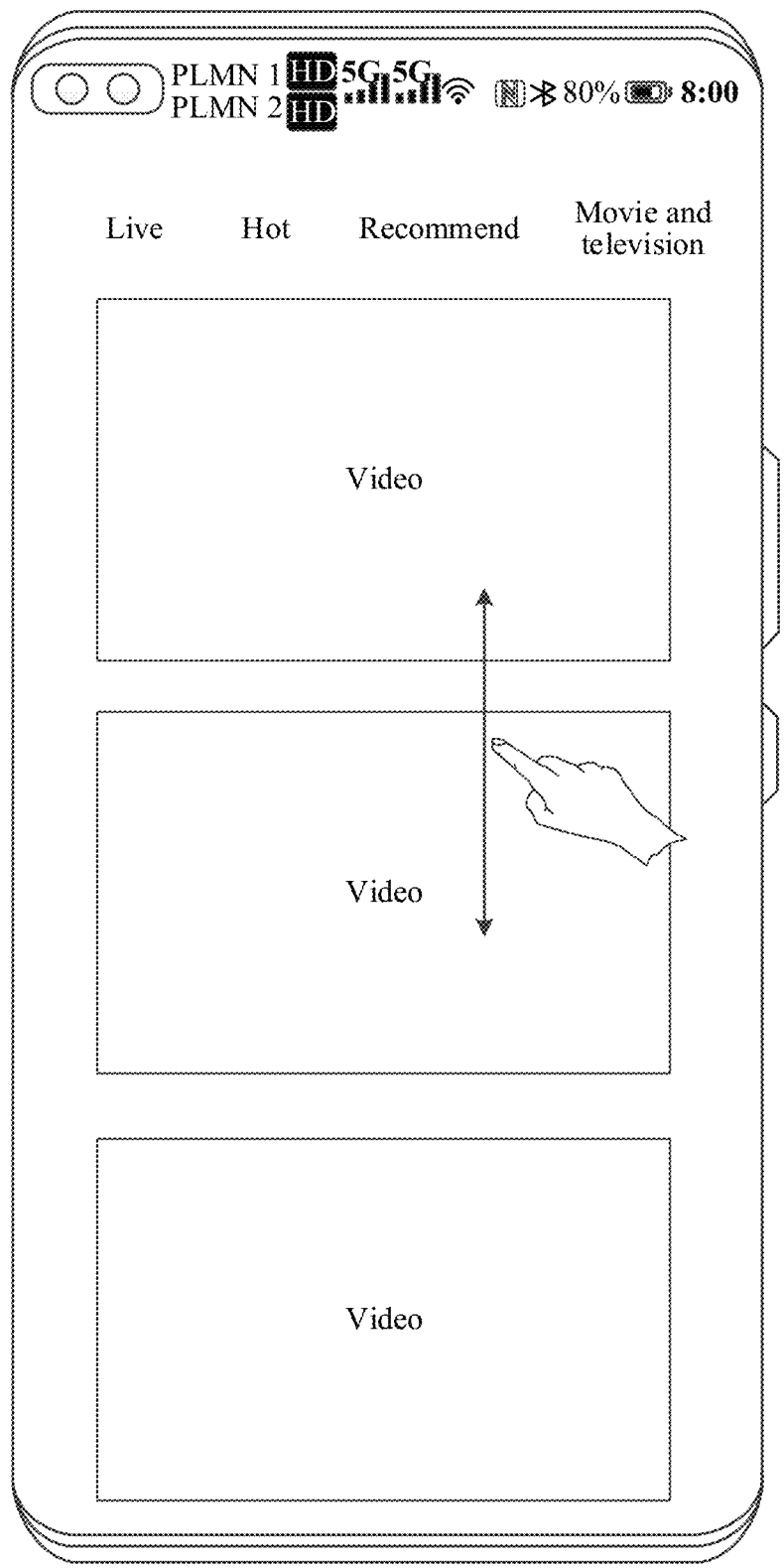

For ease of clearly describing the technical solutions of embodiments of this application, some terms and technologies involved in embodiments of this application are briefly introduced below:

1. Frame refers to a smallest unit of a single picture in interface display. A frame may be understood as a still picture, and displaying a plurality of connected frames in quick succession may form an illusion of object movement.

2. Frame rate refers to a frame number that refreshes pictures in 1 second, and may be further understood as a number of times that a graphics processing unit in a terminal device refreshes the pictures per second. A high frame rate results in a smooth and realistic animation. More frame numbers per second leads to a smooth action to be displayed.

3. Drawing may be short for image processing processes such as plotting, rendering, and/or compositing. Drawing frame rate may be understood as a frame rate used by a terminal device when executing processes such as plotting, rendering, and/or compositing.

4. TE signal may be a signal generated by an IC chip, to alleviate a tearing problem when the picture is refreshed in an image display process. For example, when the terminal device is ready to refresh a next frame of image, the IC chip may generate a TE signal. Correspondingly, after monitoring a rising edge of the TE signal, an AP may send data of the next frame of image to the IC chip. The IC chip may include a display driver integrated circuit (display driver integrated circuit, DDIC) chip and the like.

5. Vertical synchronization (vertical synchronization, Vsync) signal: The Vsync signal in an embodiment of this application may be a signal generated by an IC chip, and is used for controlling a screen display refresh process and the like. The Vsync signal is a periodic signal, and the switching of the screen refresh frame rate may reflect change of duration of a period of the Vsync. For example, when the screen refresh rate is 120 Hz, the period of the Vsync signal may be 8.3 ms. That is to say, the terminal device generates a control signal every 8.3 ms to trigger the Vsync signal periodically. When the screen refresh rate is 60 Hz, the period of the Vsync signal may be 16.6 ms. That is to say, the terminal device generates a control signal every 16.6 ms to trigger the Vsync signal periodically.

6. Refresh time may be understood as time required for screen refresh. The refresh time of the screen is inversely proportional to the screen refresh rate, for example, refresh time=1/screen refresh rate.

7. Other terms

In embodiments of this application, terms such as "first" and "second" are used to distinguish between same items or similar items that have basically same functions and purposes. For example, a first chip and a second chip are merely used to distinguish different chips, and are not intended to limit a sequence thereof. A person skilled in the art may understand that the terms "first", "second", and the like do not limit a number and an execution order, and the terms "first", "second", and the like are not limited to be necessarily different.

It should be noted that the term "example", "for example", or the like in embodiments of this application is used to represent giving an example, an illustration, or a description. Any embodiment or design solution described as "example" or "for example" in this application should not be construed as being preferred or advantageous over other embodiments or design solutions. Exactly, use of the term such as "example" or "for example" is intended to present a related concept in a specific manner.

In embodiments of this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following" or a similar expression thereof indicates any combination of these items, including a single item or any combination of a plurality of items. For example, at least one of a, b, or c may represent a, b, c, a and b, a and c, b and c, or a, b, and c, where a, b, and c may be singular or plural.

With the development of terminal device technologies, types of applications (application, APP) in a terminal device are becoming more and more abundant, and content in each APP is also increasing. A display interface of the terminal device is usually equipped with a list control to support a user's need of browsing various types of content on a display screen. The list control may be understood as a control that supports sliding operations of the user. The sliding operations can include sliding up and down, sliding left and right, or any other types of sliding. The list control can be a horizontal list control or a vertical list control. Content in the list control can include social application content, content related to system setting, document content, commodity content, pictures, videos, or the like.

For example, FIG. 1A, FIG. 1B, FIG. 1C, FIG. 1D, FIG. 1E, and FIG. 1F show schematic diagrams of several possible interfaces including a list control. For example, interfaces of a terminal device including a list control may include: an interface of a social application shown in FIG. 1A, an interface related to setting shown in FIG. 1B, a document interface shown in FIG. 1C, an interface for picture browsing shown in FIG. 1D, a desktop interface shown in FIG. 1E, or an interface of video browsing shown in FIG. 1F. The terminal device may receive an operation of sliding up or sliding down by a user on any interface in FIG. 1A, FIG. 1B, FIG. 1C, FIG. 1D, FIG. 1E, and FIG. 1F.

When the terminal device receives the sliding operation by the user on the list control, the list control can move in the direction of the sliding operation. When the sliding speed of the sliding operation is high, the sliding speed of the list control is high. Correspondingly, when the sliding speed of the sliding operation is low, the sliding speed of the list control is low.

In one implementation, to achieve a better display effect, the terminal device is configured with a maximum screen refresh rate during the sliding of the list control, and the screen refresh rate of the terminal device is rapidly reduced after the sliding on the list control ends. The maximum screen refresh rate of the terminal device being 120 Hz is used as an example for description. After the sliding on the list control is received, the screen refresh rate can be reduced in an order of 120 Hz→30 Hz→20 Hz→10 Hz. This manner of reducing the screen refresh rate may also be referred to as a conventional frame skipping mode or frequency hopping mode.

In this manner, when the screen refresh rate is required to be reduced, the transitional screen refresh rate that can be supported needs to be a screen refresh rate corresponding to a multiple of a shortest screen refresh time. For example, FIG. 2 shows a schematic diagram of a principle of the frame skipping mode in this implementation.

Figure 2:
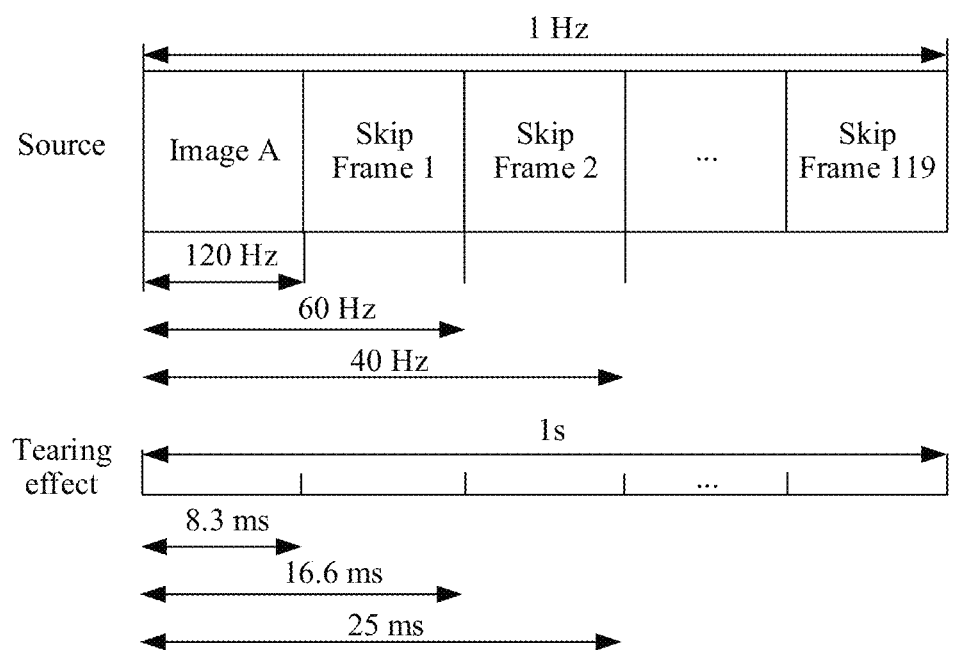
FIG. 2 is a schematic diagram of a principle of a frame skipping mode according to an embodiment of this application.

As shown in FIG. 2, each source (source) may correspond to a highest screen refresh rate (that is, a minimum refresh time) supported by components of the terminal device. Taking the maximum screen refresh rate of 120 Hz as an example, the minimum refresh time is 8.3 ms. The transitional screen refresh rate that can be supported in the frame skipping mode needs to be a frame rate corresponding to an integer multiple of 8.3 ms, such as 60 Hz and 40 Hz.

However, in this way, a range of frame rate switching is too large. For example, when the range is from 120 Hz to 60 Hz or 30 Hz, the spanning is large. This tends to cause picture freezing or flickering of a display screen.

In another implementation, to make a decline from 120 Hz to 60 Hz smooth, a hardware adjustment manner may be used, for example, performing a pulse width modulation (pulse width modulation, PWM) by adjusting an electromagnetic pulse (EM pulse) of the IC, and controlling the PWM to achieve smooth transition of the frame rate. For example, when the PWM is controlled to be 4 pulses, a frame rate switching process of 120 Hz→80 Hz→60 Hz→48 Hz→30 Hz→20 Hz→10 Hz may be implemented. However, this process needs to control the PWM to be 4 pulses throughout, a PWM frequency is merely 480 Hz, and the excessively low PWM frequency still causes the display screen to flicker.

Of course, theoretically, if a higher PWM value is set for the hardware IC, for example, if a PWM value reaches 16 pulses, smoother switching of the frame rate may be implemented and flickering of the display screen may be reduced. However, this may impose excessively high requirements on performance of the IC, and the hardware of the terminal device may not meet the requirements.

In view of this, embodiments of this application provide a frame rate switching method. In the frame rate switching process, a plurality of transition frame rates can be set. A difference value between any two adjacent transition frame rates of the plurality of transition frame rates is less than the preset value, to enable switching of the screen refresh rate of the display screen to be smoother without spanning too much; and in the switching process, the drawing frequency on the application processor AP side of the terminal device is kept synchronously changing with a TE signal obtained from an IC by the AP side, to avoid frame loss during switching. Therefore, setting of the transition frame rates is not limited to a frame rate corresponding to an integer multiple of a minimum refresh time, and the picture freezing or flickering of the display screen can be alleviated. It may be understood that frequency control in embodiments of this application does not depend on hardware performance of the terminal device, and has no great requirements on the hardware performance of the terminal device.

The terminal device in embodiments of this application may alternatively be any form of electronic device. For example, the electronic device may include a handheld device with an image processing function, a vehicle-mounted device, or the like. For example, some electronic devices are a mobile phone (mobile phone), a tablet computer, a palmtop computer, a notebook computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, a terminal device in a future evolved public land mobile network (public land mobile network, PLMN), or the like. This is not limited in embodiments of this application.

As an example but not a limitation, in embodiments of this application, the electronic device may alternatively be a wearable device. The wearable device may also be referred to as a wearable smart device, and is a generic term for wearable devices such as glasses, gloves, watches, clothing, and shoes that are intelligently designed and developed from daily wear by using wearable technologies. The wearable device is a portable device that can be directly worn on a body or integrated into clothes or an accessory of a user. The wearable device is not merely a hardware device, but can implement powerful functions through software support, data exchange, and cloud interaction. In a broad sense, the wearable smart device includes a full-featured and large-size device that can implement all or some of functions without relying on a smart phone, for example, a smart watch or smart glasses, and a device that focuses only on a specific type of application function and needs to be used together with another device such as a smart phone, for example, various types of smart bands and smart jewelry that monitor physical signs.

In addition, in embodiments of this application, the electronic device may alternatively be a terminal device in an Internet of Things (Internet of Things, IoT) system. The IoT is an important part of future information technology development. A main technical feature of the IoT is to connect an object to a network through a communication technology, to implement an intelligent network with a man-machine interconnection and an object interconnection.

In embodiments of this application, the electronic device may also be referred to as a terminal device, a user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

In embodiments of this application, the electronic device or each network device includes a hardware layer, an operating system layer running over the hardware layer, and an application layer running over the operating system layer. The hardware layer includes hardware such as a central processing unit (central processing unit, CPU), a memory management unit (memory management unit, MMU), and an internal memory (also referred to as a main memory). The operating system may be any one or more computer operating systems for implementing service processing through a process (process), for example, a Linux operating system, a Unix operating system, an Android operating system, an iOS operating system, or a Windows operating system. The application layer includes applications such as a browser, an address book, word processing software, and instant messaging software.

Figure 3:
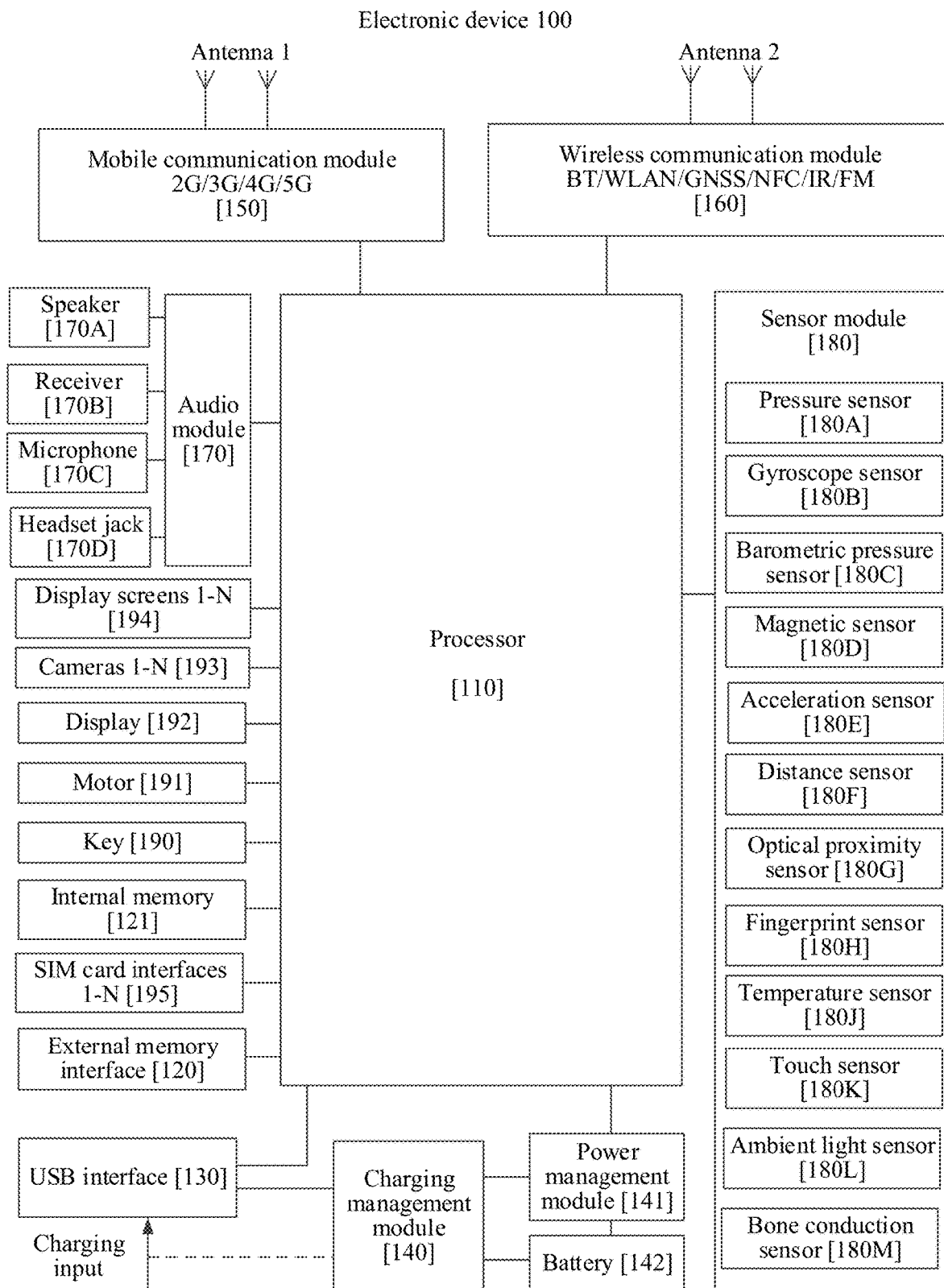
FIG. 3 is a schematic diagram of a structure of an electronic device according to an embodiment of this application.

For example, FIG. 3 shows a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure illustrated in embodiments of this invention does not constitute a specific limitation on the electronic device 100. In some other embodiments of this application, the electronic device 100 may include more or fewer components than those shown in the figure, or combine some components, or split some components, or have a different component arrangement. Components shown in the figure may be implemented through hardware, software, or a combination of software and hardware.

A processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a timing signal, to control a fetch instruction and an execution instruction.

The processor 110 may be further configured with a memory configured to store instructions and data. In some embodiments, the memory of the processor 110 is a cache. The memory may store instructions or data that is recently used or cyclically used by the processor 110. If the processor 110 needs to use the instructions or the data again, the processor can directly invoke the instructions or the data from the memory. Repeated access is avoided, and waiting time of the processor 110 is reduced, thereby improving efficiency of a system.

In some embodiments, the processor 110 may comprise one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, and a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules shown in embodiments of this invention is merely an example for description, and does not constitute a limitation on a structure of the electronic device 100. In some other embodiments of this application, different interface connection manners in the foregoing embodiments or a combination of a plurality of interface connection manners may alternatively be used for the electronic device 100.

The electronic device 100 may implement a display function through a GPU, a display screen 194, an application processor, and the like. The GPU is a microprocessor for image processing and connects the display screen 194 to the application processor. The GPU is configured to execute mathematical and geometric calculation for graphics rendering. The processor 110 may include one or more GPUs, and the GPU executes program instructions to generate or change display information.

The display screen 194 is configured to display an image, a video, and the like, the display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diode, QLED), a low temperature polycrystalline oxide (low temperature polycrystalline oxide, LTPO), or the like. In some embodiments, the electronic device 100 may include 1 or N display screens 194, where N is a positive integer greater than 1.

The electronic device 100 may implement a photographing function through the ISP, the camera 193, the video codec, the GPU, the display screen 194, the application processor, and the like.

An external memory interface 120 may be configured to be connected to an external memory card such as a Micro SD card, to expand a storage capability of the electronic device 100. The external memory card communicates with the processor 110 through the external memory interface 120, to implement a data storage function. For example, music files, video files, and other files are stored in the external memory card.

The internal memory 121 may be configured to store a computer-executable program code, and the executable program code includes instructions. The internal memory 121 may include a program storage region and a data storage region. The program storage area may store an operating system, an application program required by at least one function (for example, functions of a voice playing and an image playing), and the like. The data storage area may store data (for example, audio data and an address book) and the like created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS). The processor 110 runs the instructions stored in the internal memory 121, and/or the instructions stored in the memory disposed in the processor, to execute applications required by various functions of the electronic device 100 and data processing.

The electronic device may further include an IC chip (not shown in the figure), and the IC chip is configured to drive display of the display screen.

Figure 4:
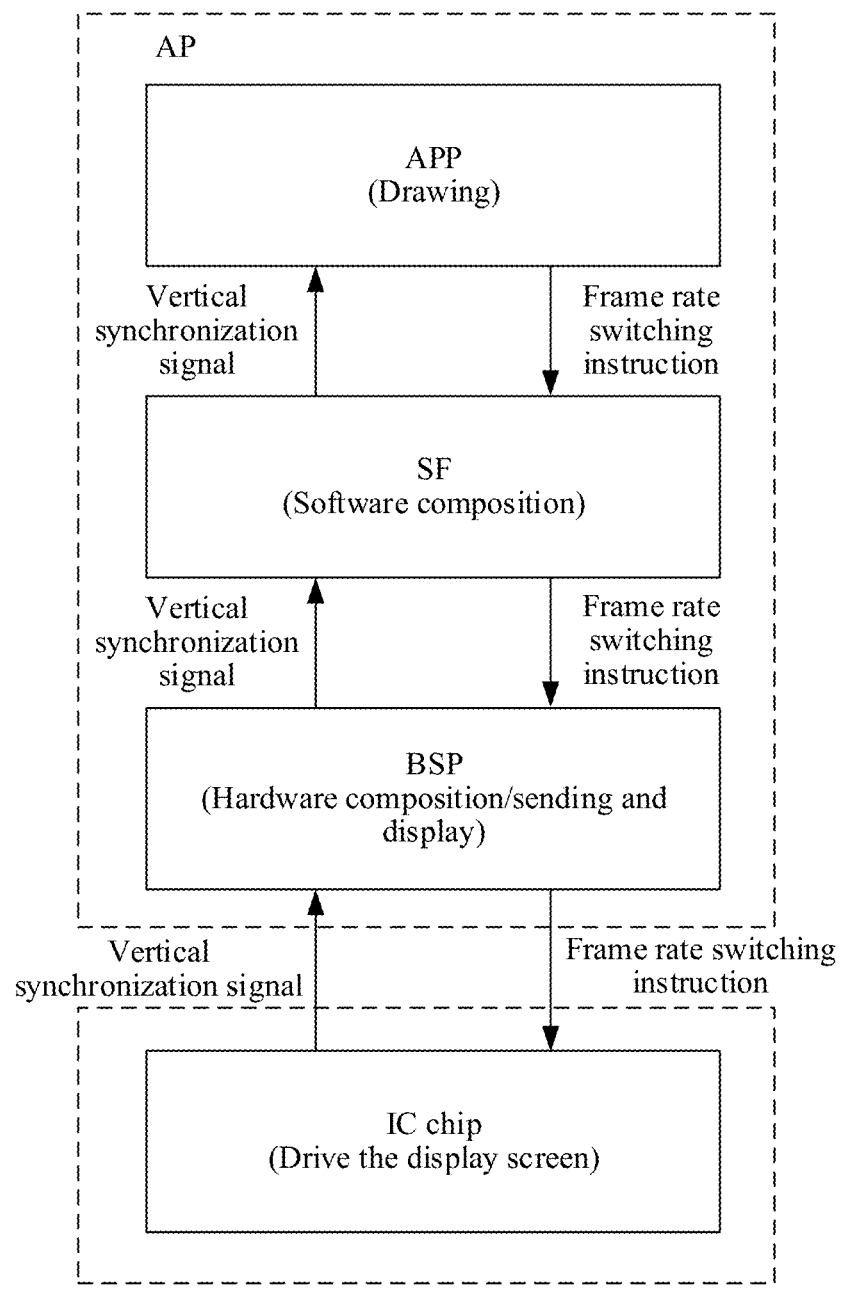
FIG. 4 is a schematic diagram of an interaction between an AP side and an IC chip according to an embodiment of this application.

For example, FIG. 4 shows a schematic diagram of an interaction between an AP side and an IC chip during frame rate switching according to an embodiment of this application;

As shown in FIG. 4, on the AP side, when an image on a display screen needs to be updated, an APP can perform drawing through a CPU and a GPU, for example, rendering a drawing. A Surface Flinger (SF) composites a rendered image through software, outputs a rasterized image, performs hardware composition on the rasterized image through a board support package (BSP) of a driver layer, and sends image data to the IC chip (that is, a sending and display process), and the IC chip drives the display screen to perform image scanning and display.

The IC chip periodically generates Vsync based on a current screen refresh rate. An AP transposes a TE signal reported by the IC chip into a software Vsync signal at the driver layer, and reports the software Vsync signal to a Surface Flinger layer for image plotting and rendering.

When frequency switching is required, the AP sends a frequency switching instruction to the IC chip through the application, the SF, and the BSP. Correspondingly, after receiving the frequency switching instruction, the IC chip adjusts the screen refresh rate.

The frame rate switching method in embodiments of this application is described in detail below through specific embodiments. The following embodiments may be implemented in combination with each other or independently, and details about the same or similar concepts or processes may not be repeated in some embodiments.

S501 and S502 are used as an example to illustrate a frame rate switching method in embodiments of this application. The method includes:

S501: A terminal device determines to perform switching of a screen refresh rate.

In embodiments of this application, the terminal device may determine that the screen refresh rate needs to be switched in any scenario where the screen refresh rate needs to be switched. The switching of the screen refresh rate may include switching from a high screen refresh rate to a low screen refresh rate, or may include switching from the low screen refresh rate to the high screen refresh rate. For example, in both scenario A and scenario B, the terminal device may determine that the screen refresh rate needs to be switched.

In the scenario A, after determining that a sliding operation ends, the terminal device can further wait until a sliding speed of a list control is less than a speed threshold, to determine that the screen refresh rate needs to be switched from high to low. The speed threshold may be a preset constant. The speed threshold may be positively correlated to a next screen refresh rate to which the screen refresh rate is switched.

In the scenario B, when determining that the sliding operation starts, the terminal device may determine that the screen refresh rate needs to be switched from low to high. For example, after a last sliding operation ends, the terminal device has reduced the screen refresh rate to some extent. In this case, when receiving a sliding operation again, the terminal device increases the screen refresh rate.

It may be understood that when the terminal device receives a sliding operation from a user, types of input events corresponding to the sliding operation may be down (down), move (move), and up (up). When obtaining a down event, the terminal device may determine that the sliding operation starts. When the terminal device obtains an up event, the terminal device may determine that the sliding operation ends.

S502: Switch the screen refresh rate from a first frame rate to a second frame rate by using a preset frame rate switching policy.

In the frame rate switching policy in embodiments of this application, a plurality of non-consecutive transition frame rates are set between the first frame rate and the second frame rate. In a process that the first frame rate is switched to the second frame rate stepwise through the plurality of transition frame rates sequentially, a difference value between any two adjacent frame rates is less than a preset value. In addition, a drawing frequency on an AP side of the terminal device synchronously changes with a TE signal obtained by the AP side.

The first frame rate may be a current screen refresh rate when the terminal device determines that the screen refresh rate needs to be switched. The second frame rate may be a preset empirical value, so that the user does not perceive screen flickering or freezing on the display screen after the screen refresh rate is switched to the second frame rate. Setting of the preset value may be related to a characteristic of the terminal device. For example, the setting of the preset value satisfies: when the difference value between any two adjacent frame rates is less than the preset value, there is no flickering or freezing on the display screen.

Reducing the screen refresh rate described in the scenario A is used as an example. The first frame rate may be a maximum screen refresh rate of the terminal device, and the second frame rate may be a lower frame rate.

For example, the first frame rate being 120 Hz, the second frame rate being 1 Hz, and the preset value being 60 are used as an example. When the first frame rate is switched to the second frame rate, a change of the frame rate value may go through the following process:

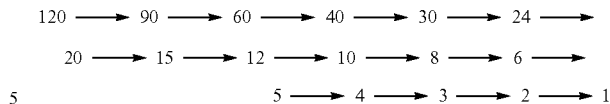

It may be understood that all the above discrete values in the process of changing from 90 to 2 can be referred to as transition frame rates. In a possible implementation, all the above discrete values in the process of changing from 90 to 2 can be set to transition frame rates, to achieve better smooth switching. In another possible implementation, part of the above discrete values in the process of changing from 90 to 2 can alternatively be set to transition frame rates, to improve switching efficiency and reduce power consumption.

In the above frame rates, a refresh time corresponding to 90 Hz is 11.1 ms, which is not an integer multiple of a minimum refresh time of 8.3 ms. In this way, a Long_V mode can be used for 90 Hz.

The Long_V mode may be understood as extension performed based on a minimum period interval of Vsync, and has no specific multiple relationship with the minimum refresh time. A period of the Vsync may include a vertical synchronization signal front porch (vertical front porch, VFP), a vertical synchronization signal back porch (vertical back porch, VBP), and a vertical synchronization signal active line count (vertical active, Vact). In the Long_V mode of embodiments of this application, the extension performed based on the minimum period interval of Vsync may be understood as extension of the VFP, so that Vact can remain unchanged, thereby reducing the problem of screen flickering caused by inconsistent turn-on time of lines due to changes of Vact.

For example, for a target frame rate, time for which the VFP is extended can be: (1/target frame rate)−(1/maximum refresh rate). For example, a value of extension for 90 Hz can be 11.1 ms−8.3 ms=2.8 ms.

Because an extended Vsync period interval corresponding to 90 Hz is not an integer multiple of the minimum period interval of the Vsync, in a TE signal corresponding to 90 Hz, arrival time of a rising edge corresponding to the Vact does not change, while a high level corresponding to the VFP is extended. In this way, when obtaining a frame rate of the Vsync at the rising edge of the TE signal, the AP considers in advance that a current frame ends and a next frame starts within the Vsync period interval corresponding to 90 Hz. Switching from 90 Hz to 60 Hz is used as an example. If a frequency used by an AP drawing is not controlled in association with the TE signal, when the TE signal is obtained at 90 Hz, a frame rate used by the AP drawing may have been switched to 60 Hz. The two frame rates do not match. Then the AP drawing has not been plotted at a frequency of 60 Hz, and the Vsync corresponding to 90 Hz has arrived. In this way, the AP cannot send images, thereby leading to frame loss and causing freezing. Therefore, a drawing frame rate of the AP drawing needs to synchronously change with the TE Signal, thereby reducing the frame loss or freezing.

It should be noted that when obtaining the Vsync frame rate on the rising edge of the TE signal, the AP considers in advance that the current frame ends and the next frame starts within the Vsync period interval corresponding to 90 Hz. Then, assuming that when a switching frame rate instruction for switching from 120 Hz to 90 Hz is received in an $(N-1)^{th}$ frame, in an $N^{th}$ frame, the frame rate obtained by the AP on the rising edge of the TE signal is still 120 Hz; only in an $(N+1)^{th}$ frame, the AP can obtain the frame rate of 90 Hz on the rising edge of the TE signal. Therefore, it may be understood that the TE signal takes effect in a next frame of a next frame of a switching frame, and the switching frame is a frame corresponding to a case that the switching frame rate instruction is obtained.

The following describes sequence diagrams of switching from a low frame rate to a high frame rate in the scenario A with reference to FIG. 5 to FIG. 8.

Figure 5:
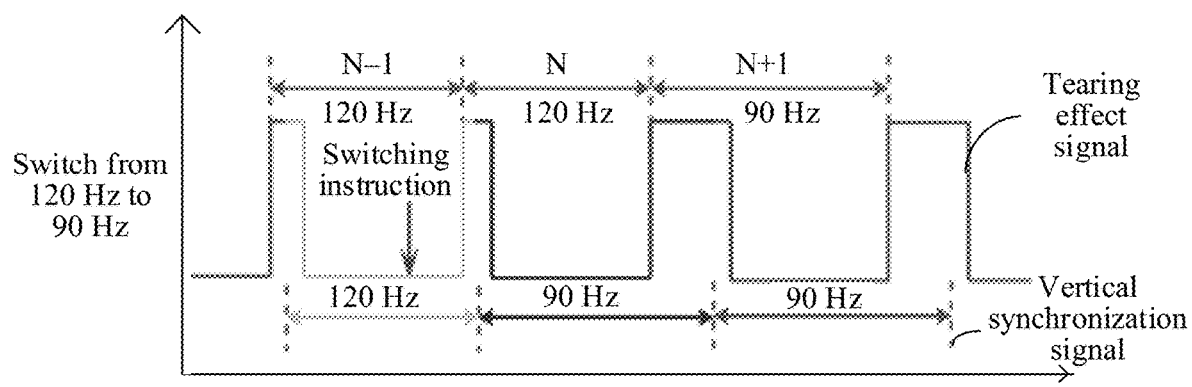
FIG. 5 is a sequence diagram according to an embodiment of this application.

For example, FIG. 5 shows a sequence diagram of switching from 120 Hz to 90 Hz.

As shown in FIG. 5, a square wave signal above may be a TE signal, and a dashed line below may represent a rising edge or a falling edge of a Vsync.

In an $(N-1)^{th}$ frame, a frame rate corresponding to the Vsync period obtained by the AP side at the rising edge of the TE signal is 120 Hz, and the AP side performs drawing at 120 Hz. In this case, the terminal device obtains the up event of the sliding operation and delivers a frame rate switching instruction, and the Vsync period switches to 90 Hz at the end of a period corresponding to 120 Hz. However, due to a Long_V characteristic of 90 Hz, the rising edge of the TE signal is shown in approximately 8.3 ms after the Vsync signal starts. Therefore, in an $N^{th}$ frame, a frame rate corresponding to the Vsync period obtained by the AP side at the rising edge of the TE signal is still 120 Hz, and the AP side still performs drawing at 120 Hz; in an $(N+1)^{th}$ frame, a frame rate corresponding to the Vsync period obtained by the AP side at the rising edge of the TE signal is 90 Hz, and the AP side performs drawing at 90 Hz.

Similarly, when the screen refresh rate is switched from 90 Hz to 60 Hz, the TE signal also takes effect in the next frame of the next frame of the switching frame. Different from switching of a screen refresh rate from 120 Hz to 90 Hz, when the screen refresh rate is switched down from 90 Hz, the Vsync is first adjusted to the maximum screen refresh rate of 120 Hz of the display screen after a period corresponding to 90 Hz ends, and then adjusted to a frame rate lower than the target frame rate of 60 Hz after a period corresponding to the maximum screen refresh rate of the display screen ends. This is to ensure that the next frame of the switching frame can be maintained at 90 Hz to avoid abnormal frames.

Figure 6:
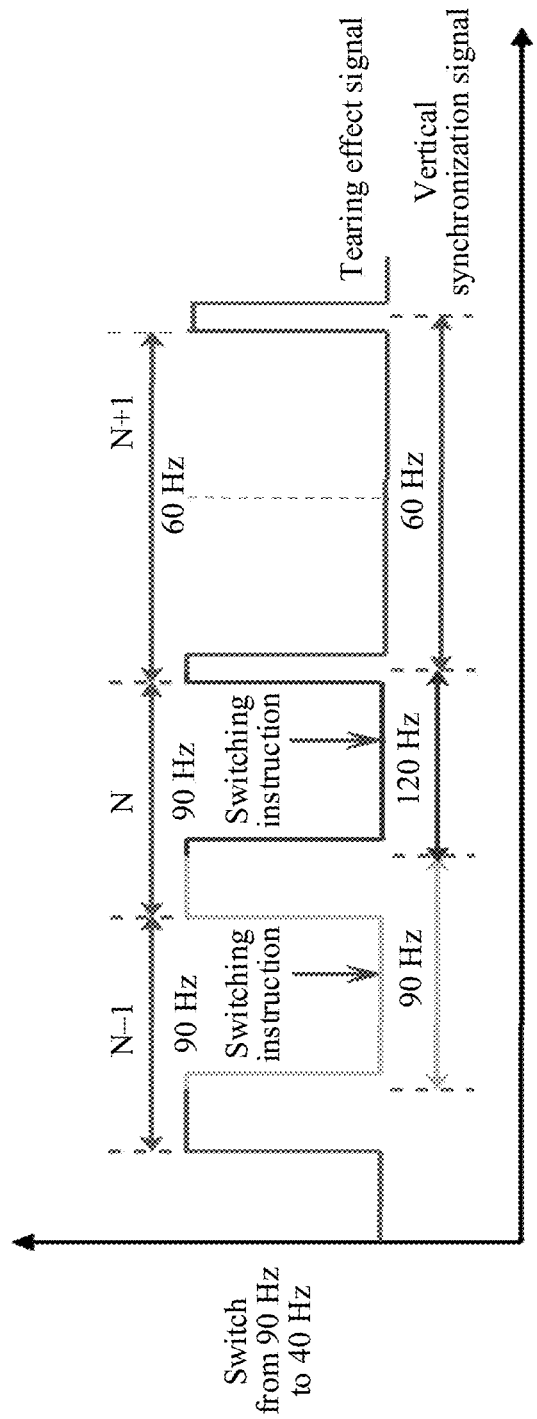
FIG. 6 is a sequence diagram according to an embodiment of this application.

For example, FIG. 6 shows a sequence diagram of switching from 90 Hz to 60 Hz.

As shown in FIG. 6, a square wave signal above may be a TE signal, and a dashed line below may represent a rising edge or a falling edge of a Vsync.

In an $(N-1)^{th}$ frame, a frame rate corresponding to the Vsync period obtained by the AP side at the rising edge of the TE signal is 90 Hz, and the AP side performs drawing at 90 Hz. In this case, the terminal device obtains the up event of the sliding operation and delivers a frame rate switching instruction, and the Vsync period switches to 120 Hz at the end of a period corresponding to 90 Hz. However, due to a Long_V characteristic of 90 Hz, the AP counts the Vsync interval of 2.8 ms behind the $(N-1)^{th}$ frame into the $N^{th}$ frame. Therefore, in the $N^{th}$ frame, though a Vsync period of the IC has been switched to 120 Hz, a frame rate corresponding to the Vsync period obtained by the AP side at the rising edge of the TE signal is still 90 Hz, and the AP side still performs drawing at 90 Hz; the terminal device delivers a frame rate switching instruction again, and the Vsync period switches to 60 Hz at the end of the period corresponding to 120 Hz. In the $(N+1)^{th}$ frame, a frame rate corresponding to the Vsync period obtained by the AP side at the rising edge of the TE signal is 60 Hz, and the AP side performs drawing at 60 Hz.

When the screen refresh rate switches from 60 Hz to 40 Hz, because the refresh times corresponding to 60 Hz and 40 Hz are both integer multiples of 8.3 ms, the TE signal can take effect in a next frame of the switching frame.

Figure 7:
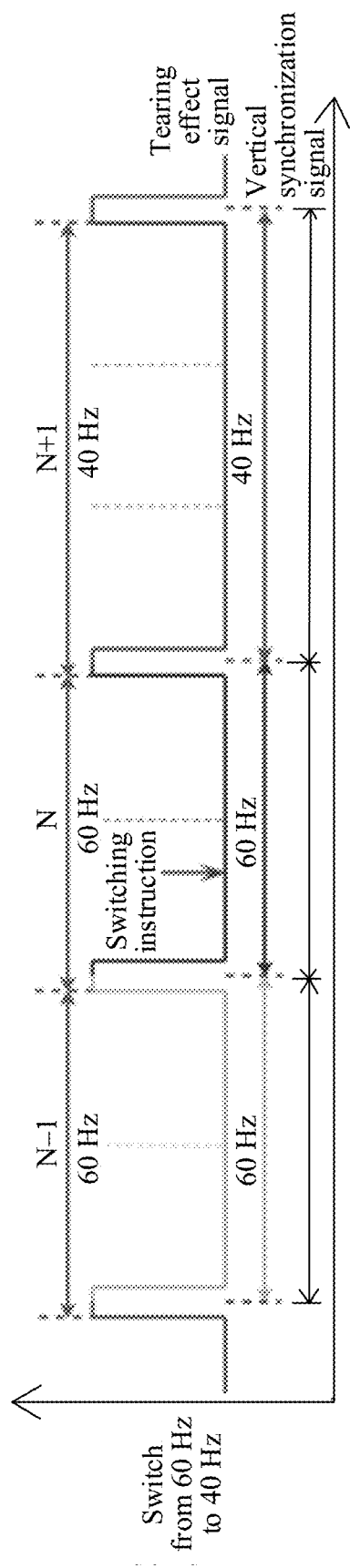
FIG. 7 is a sequence diagram according to an embodiment of this application.

For example, FIG. 7 shows a sequence diagram of switching from 60 Hz to 40 Hz.

As shown in FIG. 7, a square wave signal above may be a TE signal, and a dashed line below may represent a rising edge or a falling edge of a Vsync.

In an $(N-1)^{th}$ frame, a frame rate corresponding to the Vsync period obtained by the AP side at the rising edge of the TE signal is 60 Hz, and the AP side performs drawing at 60 Hz. In an $N^{th}$ frame, a frame rate corresponding to the Vsync period obtained by the AP side at the rising edge of the TE signal is still 60 Hz, so the AP side still performs drawing at 60 Hz. In this case, the terminal device obtains the up event of the sliding operation and delivers a frame rate switching instruction, the Vsync period switches to 40 Hz at the end of the period corresponding to 60 Hz. In an $(N+1)^{th}$ frame, a frame rate corresponding to the Vsync period obtained by the AP side at the rising edge of the TE signal is 40 Hz, and the AP side performs drawing at 40 Hz.

It may be understood that switching the screen refresh rate from 40 Hz to 20 Hz is similar to switching the screen refresh rate from 60 Hz to 40 Hz. Details are not described again.

It should be noted that in the above process, the frame rate switching of 120 Hz→90 Hz→60 Hz→40 Hz→20 Hz is used as an example for description. In a possible implementation, frame rate switching may alternatively be performed by using 120 Hz→90 Hz→40 Hz→20 Hz, or in any other frame rate switching manner that satisfies embodiments of this application. Switching from 90 Hz to 40 Hz is similar to switching from 90 Hz to 60 Hz.

Figure 8:
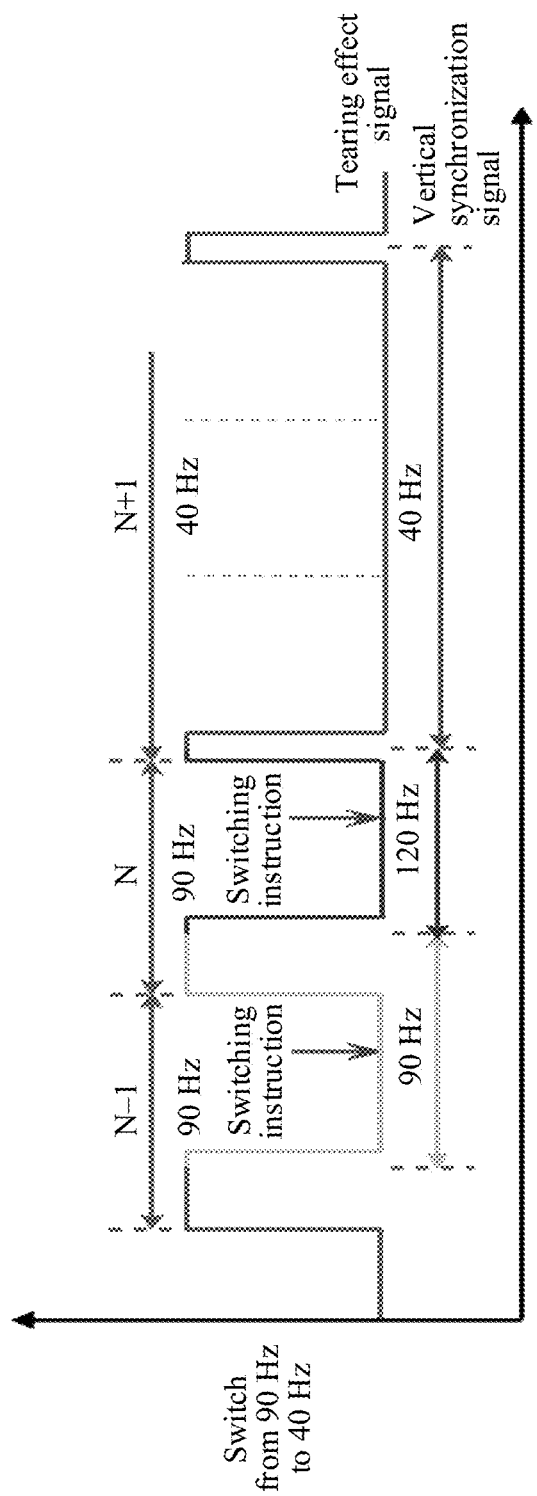
FIG. 8 is a sequence diagram according to an embodiment of this application.

For example, FIG. 8 shows a sequence diagram of switching from 90 Hz to 40 Hz.

As shown in FIG. 8, a square wave signal above may be a TE signal, and a dashed line below may represent a rising edge or a falling edge of a Vsync.

In an $(N-1)^{th}$ frame, a frame rate corresponding to the Vsync period obtained by the AP side at the rising edge of the TE signal is 90 Hz, and the AP side performs drawing at 90 Hz. In this case, the terminal device obtains the up event of the sliding operation and delivers a frame rate switching instruction, and the Vsync period switches to 120 Hz at the end of a period corresponding to 90 Hz. However, for the Vsync, due to a Long_V characteristic of 90 Hz, the AP counts the Vsync interval of 2.8 ms behind the $(N-1)^{th}$ frame into the $N^{th}$ frame. Therefore, in the $N^{th}$ frame, though a Vsync period of the IC has been switched to 120 Hz, a frame rate corresponding to the Vsync period obtained by the AP side at the rising edge of the TE signal is still 90 Hz, and the AP side still performs drawing at 90 Hz; the terminal device delivers a frame rate switching instruction again, and the Vsync period switches to 40 Hz at the end of the period corresponding to 120 Hz. In an $(N+1)^{th}$ frame, a frame rate corresponding to the Vsync period obtained by the AP side at the rising edge of the TE signal is 40 Hz, and the AP side performs drawing at 40 Hz.

It may be understood that, in a process of switching the screen refresh rate from the high frame rate to the low frame rate in the scenario A, if the terminal device receives the sliding operation again, the terminal device switches the screen refresh rate from the low frame rate to the high frame rate (that is, a case in the scenario B).

For example, when the screen refresh rate is switched from 120 Hz to 90 Hz, if the terminal device receives the sliding operation again, the terminal device switches from 90 Hz to 120 Hz.

Figure 9:
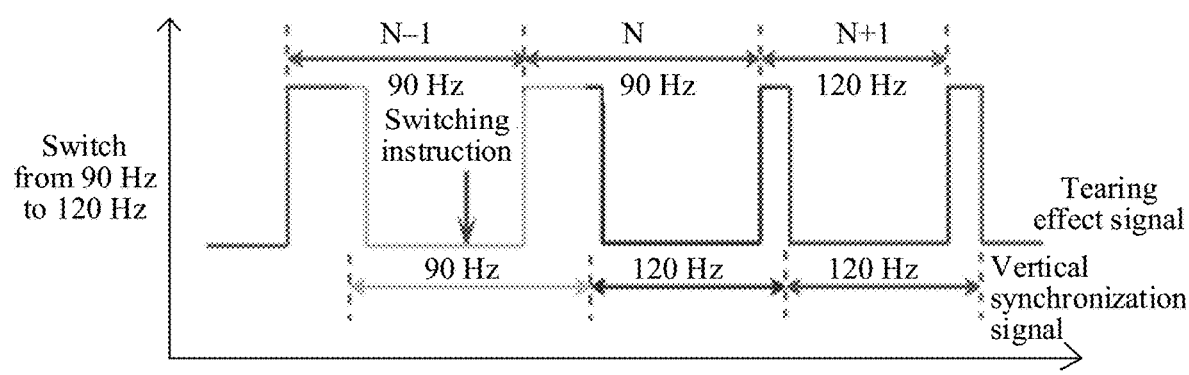
FIG. 9 is a sequence diagram according to an embodiment of this application.

For example, FIG. 9 shows a sequence diagram of switching from 90 Hz to 120 Hz.

As shown in FIG. 9, a square wave signal above may be a TE signal, and a dashed line below may represent a rising edge or a falling edge of a Vsync.

In an $(N-1)^{th}$ frame, a frame rate corresponding to the Vsync period obtained by the AP side at the rising edge of the TE signal is 90 Hz, and the AP side performs drawing at 90 Hz. In this case, the terminal device obtains the up event of the sliding operation and delivers a frame rate switching instruction, and the Vsync period switches to 120 Hz at the end of a period corresponding to 90 Hz. However, due to a Long_V characteristic of 90 Hz, the AP counts the Vsync interval of 2.8 ms behind the $(N-1)^{th}$ frame into the $N^{th}$ frame. Therefore, in the $N^{th}$ frame, though a Vsync period of the IC has been switched to 120 Hz, a frame rate corresponding to the Vsync period obtained by the AP side at the rising edge of the TE signal is still 90 Hz, and the AP side still performs drawing at 90 Hz; in an $(N+1)^{th}$ frame, a frame rate corresponding to the Vsync period obtained by the AP side at the rising edge of the TE signal is 120 Hz, and the AP side performs drawing at 120 Hz.

It should be noted that, in the above FIG. 5 to FIG. 9, a manner in which the AP side obtains a frame rate corresponding to the Vsync period may be: calculating time between two adjacent rising edges of the TE signal, where a frame rate corresponding to the time is a frame rate corresponding to the Vsync period obtained by the AP side.

In a word, changes of the TE signal on the AP side in embodiments of this application are summarized in Table 1. A drawing frame rate on the AP side, a TE frame rate on the AP side, and a Vsync frame rate inside the IC correspond to Table 2. A unit of each number in Table 1 and Table 2 is Hz. A low frequency recorded in Table 1 and Table 2 can refer to a frame rate at which the corresponding refresh time is an integer multiple of the minimum refresh time of the display screen.

TABLE 1

| Sequence number | Scenario | Changes of the TE signal on the AP side | $(N-1)^{th}$ frame (frequency switching) | $N^{th}$ (take effect in a next frame) | $(N+1)^{th}$ |
|---|---|---|---|---|---|
| 1 | 120→low frequency | Take effect in a next frame | 120 | Low frequency | |
| 2 | Low frequency 1→Low frequency 2 | Take effect in a next frame after a current frame completely runs out | Low frequency 1 | Low frequency 2 | |

| Sequence number | Scenario | Changes of the TE signal on the AP side | $(N-1)^{th}$ (frequency switching) | $(N)^{th}$ | $(N+1)^{th}$ (take effect in a next frame of the next frame) |
|---|---|---|---|---|---|
| 3 | 120→90 | The next frame is at 120, and take effect in a next frame of the next frame | 120 | 120 | 90 |
| 4 | 90→120 | The next frame is at 90, and take effect in a next frame of the next frame | 90 | 90 | 120 |

| Sequence number | Scenario | Changes of the TE signal on the AP side | $(N-1)^{th}$ (switching to 120) | $(N)^{th}$ (the AP performs frequency switching) | $(N+1)^{th}$ (take effect in a next frame of the next frame) |
|---|---|---|---|---|---|
| 5 | 90→low frequency | The next frame is a transition frame at 90 Hz, and take effect in a next frame of the next frame | 90 | 90 | Low frequency |

TABLE 2

| Sequence number | Scenario | Frame rate of each node | $(N-1)^{th}$ | $(N)^{th}$ | $(N+1)^{th}$ |
|---|---|---|---|---|---|
| 1 | 120→low frequency Example: 120→30 | AP Drawing | 120 (the AP switches to 30) | 30 | |
| | | TE signal on the AP side | 120 | 30 | |
| | | Vsync inside an IC | 120 (the AP switches to 30) | 30 | |

TABLE 2-continued

| Sequence number | Scenario | Frame rate of each node | $(N-1)^{th}$ | $(N)^{th}$ | $(N+1)^{th}$ |
|---|---|---|---|---|---|
| 2 | Low frequency 1→Low frequency 2 Example: 60→40 | AP Drawing | 60 (the AP switches to 40) | 40 | |
| | | TE signal on the AP side | 60 | 40 | |
| | | Vsync inside an IC | 60 (the AP switches to 40) | 40 | |
| 3 | 120→90 Example: 120→90 | AP Drawing | 120 | 120 (the AP switches to 90) | 90 |
| | | TE signal on the AP side | 120 | 120 | 90 |
| | | Vsync inside an IC | 120 (the driver switches to 90) | 90 | 90 |
| 4 | 90→120 Example: 90→120 | AP Drawing | 90 | 90 (the AP switches to 120) | 120 |
| | | TE signal on the AP side | 90 | 90 | 120 |
| | | Vsync inside an IC | 90 (the driver switches to 120) | 120 | 120 |
| 5 | 90→low frequency Example: 90→40 | AP Drawing | 90 | 90 (the AP switches to 40) | 40 |
| | | TE signal on the AP side | 90 | 90 | 40 |
| | | Vsync inside an IC | 90 (the driver switches to 120) | 120 (the AP switches to 40) | 40 |

In conclusion, embodiments of this application provide a frame rate switching method. In the frame rate switching process, a plurality of transition frame rates may be set. A difference value between any two adjacent transition frame rates of the plurality of transition frame rates is less than the preset value, to enable the switching of the screen refresh rate of the display screen to be smoother without spanning too much; and in the switching process, the drawing frequency on the application processor AP side of the terminal device is kept synchronously changing with a TE signal obtained from an IC by the AP side, to avoid frame loss during switching. Therefore, setting of the transition frame rates is not limited to a frame rate corresponding to an integer multiple of a minimum refresh time, and the picture freezing or flickering of the display screen can be alleviated. It may be understood that frequency control in embodiments of this application does not depend on hardware performance of the terminal device, and has no great requirements on the hardware performance of the terminal device.

It should be noted that the maximum screen refresh rate of 120 Hz in embodiments of this application may alternatively be replaced with a larger or smaller value, such as 480 Hz or 60 Hz. The 90 Hz in embodiments of this application can be replaced with a target frame rate at which any corresponding refresh time and the minimum refresh time of the display screen are in a non-integer multiple relationship. There may be one or more target frame rates. In embodiments of this application, the TE signal may alternatively be put into effect in the next frame of the next frame of the switching frame in other manners. Content of the above replacement only needs to satisfy the implementation of the frame rate switching method of this application, and embodiments of this application do not specifically limit the above content.

In a possible implementation of embodiments of this application, the frame rate switching may alternatively be performed in stages. For example, when the terminal device has switched to the second frame rate, if the sliding speed of the list control is higher than the second speed threshold, the second frame rate is maintained; when the sliding speed of the list control is lower than or equal to the second speed threshold, the screen display rate of the display screen is switched from the second frame rate to the third frame rate through the IC, and the third frame rate is lower than the second frame rate.

The second frame rate may be a higher frame rate, such as 20 Hz, the third frame rate may be a lower frame rate or a minimum screen refresh rate, such as 1 Hz, and the second speed threshold may be 0 or a value close to 0. In this way, when the list control is sliding, the terminal device may maintain a high screen refresh rate, to alleviate a problem of interface flickering or freezing caused by a low screen refresh rate. When the list control is stationary, the AP side may be unaware that the screen display rate of the display screen is switched from the second frame rate to the third frame rate by using the IC, to reduce resource occupation on the AP side.

Figure 10:
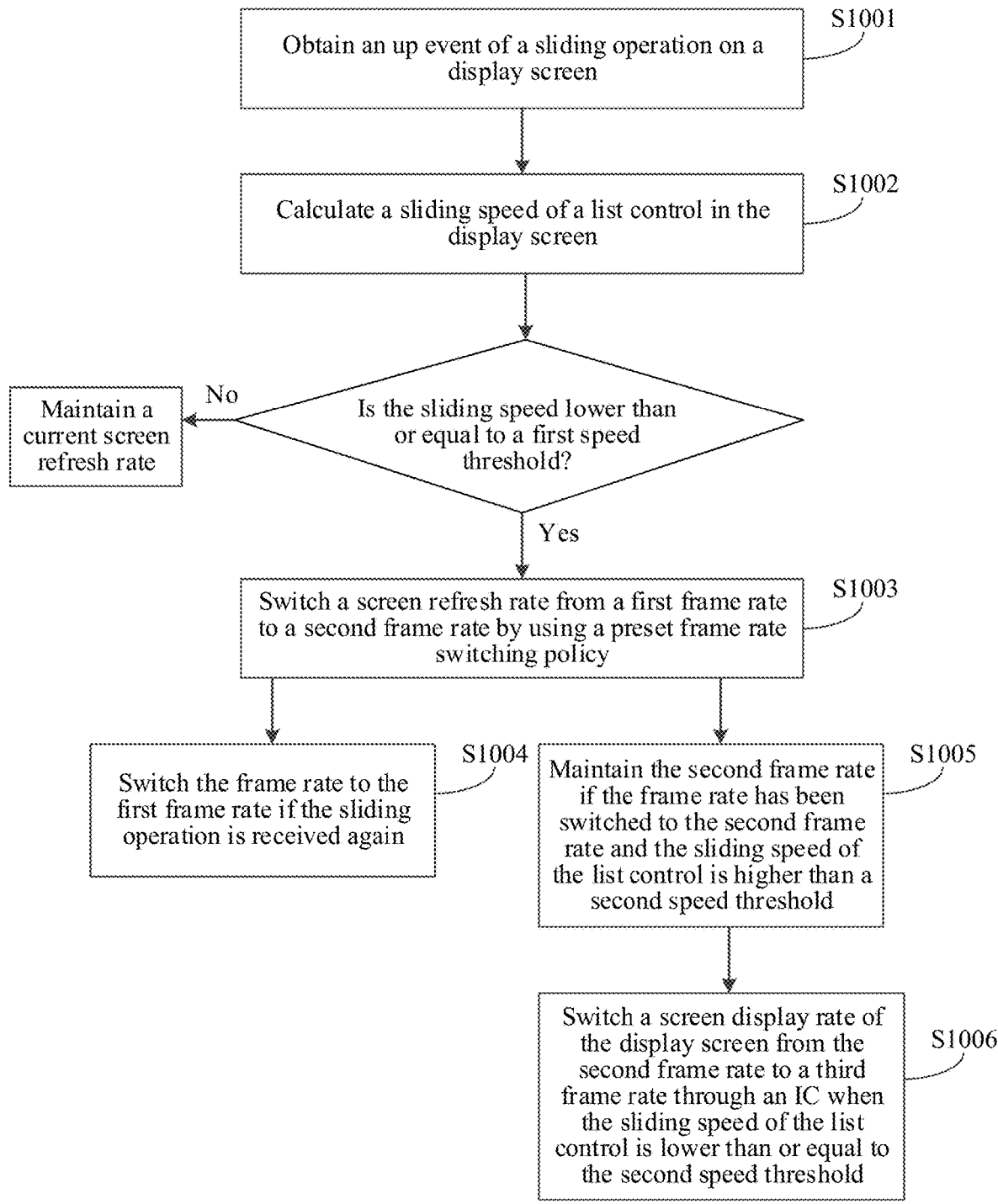
FIG. 10 is a schematic flowchart of frame rate switching according to an embodiment of this application.

For example, FIG. 10 shows a schematic flowchart of specific frame rate switching according to an embodiment of this application. As shown in FIG. 10, the method includes the following steps:

S1001: A terminal device obtains an up event of a sliding operation on a display screen.

S1002: In response to the up event of the sliding operation on the display screen, the terminal device calculates a sliding speed of a list control in the display screen.

In embodiments of this application, neither of manners in which the terminal device detects the up event of the sliding operation and calculates the sliding speed of the list control in the display screen is specifically limited.

S1003: When the sliding speed of the list control is lower than or equal to a first speed threshold, the terminal device switches a screen refresh rate from a first frame rate to a second frame rate by using a preset frame rate switching policy.

In embodiments of this application, the first speed threshold may be a speed threshold related to a buffer frame rate adjacent to the first frame rate, for example, the first speed threshold may be in direct proportion to a size of the buffer frame rate adjacent to the first frame rate. Because the buffer frame rate adjacent to the first frame rate is set not to be too low when the first frame rate drops in embodiments of this application, embodiments of this application can adaptively achieve smooth frame rate switching in dynamic content when the activity speed of the list control is high, to reduce power consumption of the terminal device.

Optionally, when the sliding speed of the list control is higher than the first speed threshold, the terminal device may maintain the first frame rate.

For details of the implementation in which the terminal device switches the screen refresh rate from the first frame rate to the second frame rate by using the preset frame rate switching policy, refer to descriptions of the foregoing embodiments. Details are not described herein.

S1004: Switch the screen refresh rate of the display screen to the first frame rate if the sliding operation for the list control is received, in a process of switching the screen refresh rate from the first frame rate to the second frame rate by using the frame rate switching policy.

S1005: Maintain the second frame rate if the sliding speed of the list control is higher than a second speed threshold, when the terminal device has switched to the second frame rate.

S1006: Switch the screen display rate of the display screen from the second frame rate to a third frame rate through an IC when the sliding speed of the list control is lower than or equal to the second speed threshold, where the third frame rate is lower than the second frame rate.

For specific implementations of S1004 and S1006, refer to the descriptions in the foregoing embodiments. Details are not described herein. It may be understood that steps different from S501 and S502 in the embodiment corresponding to FIG. 10 may be regarded as optional steps.

Embodiments of this application may implement smooth switching of the screen refresh rate of the display screen when a user has a hand sliding away from a sliding interface, and keep a drawing frequency on an AP side of the terminal device synchronously changing with a TE signal obtained from the IC by the AP side in a switching process, to reduce frame loss in the smooth switching, thereby alleviating picture freezing or flickering of the display screen and taking into account an eye protection characteristic of the screen.

The foregoing mainly describes solutions according to embodiments of this application from a method perspective. To implement foregoing functions, corresponding hardware structures and/or software modules for performing the functions are included. A person skilled in the art needs to be easily aware that the method steps in the examples described with reference to the embodiments disclosed in this specification may be implemented in this application in a form of hardware or a combination of hardware and computer software. Whether a function is performed by the hardware or hardware driven by the computer software depends on a particular application and design constraint conditions of the technical solutions. A person skilled in the art may use different methods to implement the described functions for each particular application, but it needs to not be considered that such implementation goes beyond scope of this application.

In the embodiments of this application, an apparatus for implementing a frame rate switching method may be divided into functional modules based on the foregoing method examples, for example, each functional module may be obtained through division for each corresponding function, or two or more functions may be integrated into one processing module. An integrated module may be implemented in a form of the hardware or a software function module. It should be noted that division of the modules in the embodiments of this application is an example, and is merely logical function division. During actual implementation, there may be another division manner.

Figure 11:
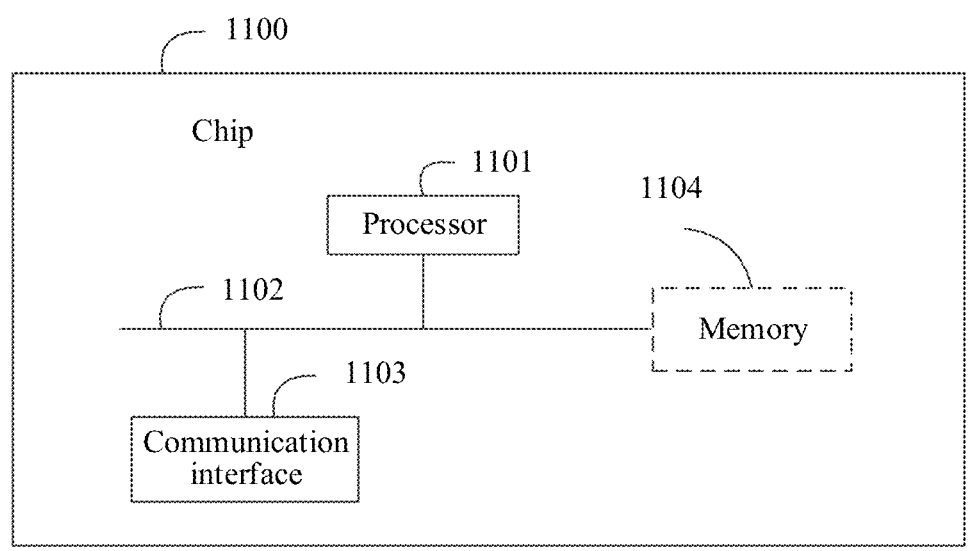
FIG. 11 is a schematic diagram of a structure of a chip according to an embodiment of this application.

FIG. 11 is a schematic diagram of a structure of a chip according to an embodiment of this application. A chip 1100 includes one or at least two (including two) processors 1101, a communication line 1102, a communication interface 1103, and a memory 1104.

In some implementations, the memory 1104 stores the following elements: an executable module or a data structure, or subsets thereof, or extended sets thereof.

The foregoing method described in embodiments of this application may be applied to the processor 1101, or implemented by the processor 1101. The processor 1101 may be an integrated circuit chip and has a signal processing capability. In an implementation process, the steps of the foregoing method may be completed by using a hardware-integrated logic circuit in the processor 1101 or instructions in a form of the software. The above processor 1201 may be a general-purpose processor (for example, a microprocessor or a conventional processor), a digital signal processor (digital signal processing, DSP), an application-specific integrated circuit (application-specific integrated circuit, ASIC), a field-programmable gate array (field-programmable gate array, FPGA), or another programmable logic device, a discrete gate, a transistor logic device, or a discrete hardware component. The processor 1101 may implement or execute various processing-related methods, steps, and logical block diagrams disclosed in embodiments of this application.

The steps of the method disclosed in embodiments of this application may be directly executed by a hardware decoding processor or executed by a combination of the hardware and the software module in a decoding processor. The software module may be located in a mature storage medium in the art, such as a random access memory, a read-only memory, a programmable read-only memory, or an electrically erasable programmable read-only memory (electrically erasable programmable read only memory, EEPROM). The storage medium is located in the memory 1104, and the processor 1101 reads information in the memory 1104 and completes the steps of the foregoing method in combination with hardware in the processor.

The processor 1101, the memory 1104, and the communication interface 1103 may communicate with each other by using the communication line 1102.

In the foregoing embodiment, the instructions stored in the memory and executed by the processor may be implemented in a form of a computer program product. The computer program product may be written in the memory in advance, or may be downloaded and installed in the memory in the form of the software.

Embodiments of this application further provides a computer program product, including one or more computer instructions. When computer program instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (digital subscriber line, DSL)) or a wireless (for example, infrared, radio, and microwave, or the like) manner. The computer-readable storage medium may be any usable medium accessible by the computer, or a data storage device, for example, a server or a data center, integrating one or more usable media. For example, the usable media may include a magnetic medium (for example, a floppy disk, a hard disk, or a magnetic tape), an optical medium (for example, a digital versatile disc (digital versatile disc, DVD)), a semi-conductive medium (for example, a solid state disk (solid state disk, SSD)), or the like.

An embodiment of this application further provides a computer-readable storage medium. All or part of the methods described in the foregoing embodiments may be implemented by the software, the hardware, firmware, or any combination thereof. The computer-readable medium may include a computer storage medium and a communication medium, and may further include any medium that can transfer the computer program from one place to another. The storage medium may be any target medium accessible to the computer.

As a possible design, the computer-readable medium may include a compact disc read-only memory (compact disc read-only memory, CD-ROM), a RAM, a ROM, an EEPROM or other disc storage. The computer-readable medium may include magnetic disk storage or other magnetic disk storage devices. In addition, any connecting line may also be appropriately referred to as the computer-readable medium. For example, if the software is transmitted from the website, the server, or another remote source by using the coaxial cable, an optical fiber cable, a twisted pair, the DSL, or a wireless technology (such the infrared, the radio, or the microwave), the coaxial cable, the optical fiber cable, the twisted pair, the DSL, or the wireless technology such as the infrared, the radio, or the microwave are included in a definition of a medium. A magnetic disk and an optical disc used herein include an optical disc (CD), a laser disc, an optical disc, a digital versatile disc (digital versatile disc, DVD), a floppy disk, and a blue ray disc, where the magnetic disk generally reproduces data in a magnetic manner, and the optical disc reproduces data optically by using laser.

Embodiments of this application are described with reference to the flowcharts and/or block diagrams of the method, the device (system), and the computer program product according to embodiments of this application. It needs to be understood that computer program instructions may implement each procedure and/or block in the flowcharts and/or block diagrams and a combination of procedures and/or blocks in the flowcharts and/or block diagrams. These computer program instructions may be provided for the general-purpose computer, the dedicated computer, an embedded processor, or a processing unit of another programmable data processing device to generate a machine, so that the instructions executed by the computer or the processing unit of the another programmable data processing device generate the apparatus for implementing a specified function in one or more processes in the flowcharts and/or in one or more blocks in the block diagrams.

What is claimed is:

1. A frame rate switching method, applied to a terminal device, wherein the terminal device comprises an application processor (AP) and an integrated circuit (IC), the AP is electrically connected to the IC, for the AP to obtain a tearing effect (TE) signal from the IC, and the method comprises:
    determining to perform switching of a screen refresh rate; and
    switching the screen refresh rate from a first frame rate to a second frame rate by using a preset frame rate switching policy, wherein
    a plurality of transition frame rates which are non-consecutive are set between the first frame rate and the second frame rate in the frame rate switching policy; and in a process that the first frame rate is switched to the second frame rate stepwise through the plurality of transition frame rates sequentially, a difference value between any two adjacent frame rates is less than a preset value, and a drawing frequency on an AP side of the terminal device synchronously changes with the TE signal obtained by the AP side;
    wherein the plurality of transition frame rates comprise a target frame rate, and a refresh time corresponding to the target frame rate is in a non-integer multiple relationship with a minimum refresh time of a display screen; and
    in a process of switching the screen refresh rate from the first frame rate to the second frame rate by using the frame rate switching policy, when switching from a frame rate adjacent to the target frame rate to the target frame rate, or switching from the target frame rate to a frame rate adjacent to the target frame rate, the TE signal obtained by the AP side takes effect in a next frame of a next frame of a switching frame, and the switching frame is a frame corresponding to a case that a switching frame rate instruction is obtained.

2. The method according to claim 1, wherein when the target frame rate is switched to a frame rate lower than the target frame rate, a vertical synchronization signal Vsync in the IC is first adjusted to a maximum screen refresh rate of the display screen after a period corresponding to the target frame rate ends, and then adjusted to the frame rate lower than the target frame rate after a period corresponding to the maximum screen refresh rate of the display screen ends.

3. The method according to claim 1, wherein after the switching the screen refresh rate from the first frame rate to the second frame rate by using the preset frame rate policy, the method further comprises:
    maintaining the second frame rate if a sliding speed of a list control is higher than a second speed threshold, when the terminal device has switched to the second frame rate; and
    switching the screen display rate of the display screen from the second frame rate to a third frame rate through the IC, when the sliding speed of the list control is lower than or equal to the second speed threshold, wherein the third frame rate is lower than the second frame rate.

4. The method according to claim 3, wherein the second frame rate is a preset frame rate, and the third frame rate is a minimum screen refresh rate of the terminal device.

5. The method according to claim 1, wherein the method further comprises:
  switching the screen refresh rate of the display screen to the first frame rate if a sliding operation for the list control is received, in the process of switching the screen refresh rate from the first frame rate to the second frame rate by using the frame rate switching policy.

6. The method according to claim 5, wherein if the sliding operation for the list control is received, the screen refresh rate of the display screen is a target frame rate; when the screen refresh rate of the display screen is switched from the target frame rate to the first frame rate, the TE signal obtained by the AP side takes effect in a next frame of a next frame of a switching frame, and the switching frame is the frame corresponding to the case that the switching frame rate instruction is obtained.

7. The method according to claim 1, wherein the determining to perform switching of the screen refresh rate comprises:
  calculating the sliding speed of the list control in the display screen in response to an up event of the sliding operation in the display screen, wherein the sliding operation acts on the list control; and
  determining to perform the switching of the screen refresh rate when the sliding speed of the list control is lower than or equal to a first speed threshold.

8. The method according to claim 1, wherein the first frame rate is the maximum screen refresh rate of the display screen.

9. A terminal device, comprising a memory and a processor, wherein the memory is configured to store a computer program, and the processor is configured to execute the computer program, to perform a frame rate switching method applied to the terminal device, wherein the terminal device comprises an application processor (AP) and an integrated circuit (IC), the AP is electrically connected to the IC, for the AP to obtain a tearing effect (TE) signal from the IC, and the method comprises:
  determining to perform switching of a screen refresh rate; and
  switching the screen refresh rate from a first frame rate to a second frame rate by using a preset frame rate switching policy, wherein
  a plurality of transition frame rates which are non-consecutive are set between the first frame rate and the second frame rate in the frame rate switching policy; and in a process that the first frame rate is switched to the second frame rate stepwise through the plurality of transition frame rates sequentially, a difference value between any two adjacent frame rates is less than a preset value, and a drawing frequency on an AP side of the terminal device synchronously changes with the TE signal obtained by the AP side;
  wherein the plurality of transition frame rates comprise a target frame rate, and a refresh time corresponding to the target frame rate is in a non-integer multiple relationship with a minimum refresh time of a display screen; and
  in a process of switching the screen refresh rate from the first frame rate to the second frame rate by using the frame rate switching policy, when switching from a frame rate adjacent to the target frame rate to the target frame rate, or switching from the target frame rate to a frame rate adjacent to the target frame rate, the TE signal obtained by the AP side takes effect in a next frame of a next frame of a switching frame, and the switching frame is a frame corresponding to a case that a switching frame rate instruction is obtained.

10. A non-transitory computer-readable storage medium, wherein the non-transitory computer-readable storage medium stores instructions, and when the instructions are executed, a computer is enabled to perform a frame rate switching method applied to a terminal device, wherein the terminal device comprises an application processor (AP) and an integrated circuit (IC), the AP is electrically connected to the IC, for the AP to obtain a tearing effect (TE) signal from the IC, and the method comprises:
  determining to perform switching of a screen refresh rate; and
  switching the screen refresh rate from a first frame rate to a second frame rate by using a preset frame rate switching policy, wherein
  a plurality of transition frame rates which are non-consecutive are set between the first frame rate and the second frame rate in the frame rate switching policy; and in a process that the first frame rate is switched to the second frame rate stepwise through the plurality of transition frame rates sequentially, a difference value between any two adjacent frame rates is less than a preset value, and a drawing frequency on an AP side of the terminal device synchronously changes with the TE signal obtained by the AP side;
  wherein the plurality of transition frame rates comprise a target frame rate, and a refresh time corresponding to the target frame rate is in a non-integer multiple relationship with a minimum refresh time of a display screen; and
  in a process of switching the screen refresh rate from the first frame rate to the second frame rate by using the frame rate switching policy, when switching from a frame rate adjacent to the target frame rate to the target frame rate, or switching from the target frame rate to a frame rate adjacent to the target frame rate, the TE signal obtained by the AP side takes effect in a next frame of a next frame of a switching frame, and the switching frame is a frame corresponding to a case that a switching frame rate instruction is obtained.

11. The terminal device according to claim 9, wherein when the target frame rate is switched to a frame rate lower than the target frame rate, a vertical synchronization signal Vsync in the IC is first adjusted to a maximum screen refresh rate of the display screen after a period corresponding to the target frame rate ends, and then adjusted to the frame rate lower than the target frame rate after a period corresponding to the maximum screen refresh rate of the display screen ends.

12. The terminal device according to claim 9, wherein after the switching the screen refresh rate from the first frame rate to the second frame rate by using the preset frame rate policy, the method further comprises:
  maintaining the second frame rate if a sliding speed of a list control is higher than a second speed threshold, when the terminal device has switched to the second frame rate; and
  switching the screen display rate of the display screen from the second frame rate to a third frame rate through the IC, when the sliding speed of the list control is lower than or equal to the second speed threshold, wherein the third frame rate is lower than the second frame rate.

13. The terminal device according to claim 12, wherein the second frame rate is a preset frame rate, and the third frame rate is a minimum screen refresh rate of the terminal device.

14. The terminal device according to claim 9, wherein the method further comprises:
    switching the screen refresh rate of the display screen to the first frame rate if a sliding operation for the list control is received, in the process of switching the screen refresh rate from the first frame rate to the second frame rate by using the frame rate switching policy.

15. The terminal device according to claim 14, wherein if the sliding operation for the list control is received, the screen refresh rate of the display screen is a target frame rate; when the screen refresh rate of the display screen is switched from the target frame rate to the first frame rate, the TE signal obtained by the AP side takes effect in a next frame of a next frame of a switching frame, and the switching frame is the frame corresponding to the case that the switching frame rate instruction is obtained.

16. The terminal device according to claim 9, wherein the determining to perform switching of the screen refresh rate comprises:
    calculating the sliding speed of the list control in the display screen in response to an up event of the sliding operation in the display screen, wherein the sliding operation acts on the list control; and
    determining to perform the switching of the screen refresh rate when the sliding speed of the list control is lower than or equal to a first speed threshold.

17. The terminal device according to claim 9, wherein the first frame rate is the maximum screen refresh rate of the display screen.

18. The non-transitory computer-readable storage medium according to claim 10, wherein when the target frame rate is switched to a frame rate lower than the target frame rate, a vertical synchronization signal Vsync in the IC is first adjusted to a maximum screen refresh rate of the display screen after a period corresponding to the target frame rate ends, and then adjusted to the frame rate lower than the target frame rate after a period corresponding to the maximum screen refresh rate of the display screen ends.

19. The non-transitory computer-readable storage medium according to claim 10, wherein after the switching the screen refresh rate from a first frame rate to a second frame rate by using a preset frame rate policy, the method further comprises:
    maintaining the second frame rate if a sliding speed of a list control is higher than a second speed threshold, when the terminal device has switched to the second frame rate; and
    switching the screen display rate of the display screen from the second frame rate to a third frame rate through the IC, when the sliding speed of the list control is lower than or equal to the second speed threshold, wherein the third frame rate is lower than the second frame rate.

20. The non-transitory computer-readable storage medium according to claim 19, wherein the second frame rate is a preset frame rate, and the third frame rate is a minimum screen refresh rate of the terminal device.

* * * * *